(12) United States Patent
Wu et al.

(10) Patent No.: US 12,284,067 B2
(45) Date of Patent: Apr. 22, 2025

(54) LONG TRAINING FIELD WITH REDUCED PEAK-TO-AVERAGE POWER RATIO

(71) Applicant: QUALCOMM Incorporated, San Diego, CA (US)

(72) Inventors: Kanke Wu, San Diego, CA (US); Jialing Li Chen, San Diego, CA (US); Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/353,673

(22) Filed: Jun. 21, 2021

(65) Prior Publication Data

US 2021/0399933 A1 Dec. 23, 2021

Related U.S. Application Data

(60) Provisional application No. 63/051,264, filed on Jul. 13, 2020, provisional application No. 63/046,569,
(Continued)

(51) Int. Cl.
*H04W 4/00* (2018.01)
*H04L 27/26* (2006.01)
*H04W 84/12* (2009.01)

(52) U.S. Cl.
CPC ...... *H04L 27/2621* (2013.01); *H04L 27/2607* (2013.01); *H04L 27/2613* (2013.01); *H04W 84/12* (2013.01)

(58) Field of Classification Search
None
See application file for complete search history.

(56) References Cited

U.S. PATENT DOCUMENTS

| 10,159,043 B1 | 12/2018 | Cao et al. |
| 2011/0013607 A1* | 1/2011 | Van Nee ............. H04L 27/2621 370/310 |

(Continued)

FOREIGN PATENT DOCUMENTS

| EP | 3780531 A1 | 2/2021 |
| TW | 201715905 A | 5/2017 |
| WO | 2019184626 A1 | 10/2019 |

OTHER PUBLICATIONS

Chun J (LGE), et al., "EHT-LTF Sequences Considering the New Tone Plan", IEEE Draft, 11-20-0825-00-00BE-EHT-LTF-Sequences-In-New-Tone-Plan, IEEE-SA Mentor, Piscataway, NJ USA, vol. 802.11 EHT, 802.11be, Jun. 1, 2020 (Jun. 1, 2020), pp. 1-17, XP068168131, Retrieved from the Internet: URL:https://mentor.ieee.org/802.11/dcn/20/11-20-0825-00-00be-eht-ltf-sequences-in-new-tone-plan.pptx [retrieved on Jun. 1, 2020] Slides 2-4.
(Continued)

*Primary Examiner* — Bob A Phunkulh
(74) *Attorney, Agent, or Firm* — Loza & Loza LLP

(57) ABSTRACT

Various aspects relate generally to the generation and wireless transmission of a long training field (LTF) and a data field within a 320 MHz or 240 MHz bandwidth channel. The LTF includes an LTF sequence based on a concatenation of a plurality of LTF subsequences, each LTF subsequence being associated with a channel bandwidth less than the total bandwidth of the channel, each of the plurality of LTF subsequences being selectively phase-rotated to reduce a peak-to-average power ratio. Each of the plurality of LTF subsequences may be associated with an LTF designed for an 80 MHz bandwidth channel. The LTF and the data field may then be transmitted in a wireless packet to at least one second wireless communication device via the 320 MHz or 240 MHz bandwidth channel.

26 Claims, 20 Drawing Sheets

Related U.S. Application Data filed on Jun. 30, 2020, provisional application No. 63/042,557, filed on Jun. 22, 2020.

(56) References Cited

U.S. PATENT DOCUMENTS

| | | | | |
|---|---|---|---|---|
| 2011/0194544 | A1* | 8/2011 | Yang | H04L 27/2621 370/338 |
| 2014/0153507 | A1* | 6/2014 | Yang | H04L 27/2602 370/329 |
| 2015/0365263 | A1* | 12/2015 | Zhang | H04L 5/0046 375/295 |
| 2016/0286551 | A1* | 9/2016 | Lee | H04L 27/2613 |
| 2018/0159714 | A1* | 6/2018 | Lee | H04L 65/40 |
| 2018/0287826 | A1* | 10/2018 | Lindskog | H04L 25/0204 |
| 2019/0289612 | A1* | 9/2019 | Chen | H04L 27/2613 |
| 2021/0250125 | A1* | 8/2021 | Park | H04L 1/0068 |
| 2021/0320830 | A1* | 10/2021 | Park | H04L 27/2603 |
| 2021/0320831 | A1* | 10/2021 | Park | H04L 27/2621 |
| 2021/0336827 | A1* | 10/2021 | Park | H04L 1/0069 |
| 2021/0344540 | A1* | 11/2021 | Park | H04L 27/261 |
| 2022/0140962 | A1* | 5/2022 | Park | H04L 27/262 370/330 |
| 2022/0247544 | A1* | 8/2022 | Park | H04L 5/0092 |
| 2022/0361170 | A1* | 11/2022 | Park | H04L 27/262 |
| 2023/0239191 | A1* | 7/2023 | Park | H04L 1/08 370/329 |

OTHER PUBLICATIONS

International Search Report and Written Opinion—PCT/US2021/038439—ISA/EPO—Oct. 6, 2021.

Kim J (LG Electronics), et al., "Consideration of EHT-LTF", IEEE Draft, 11-19-1925-02-00BE-Consideration-of-EHT-LTF, IEEE-SA Mentor, Piscataway, NJ USA, vol. 802.11 EHT, 802.11be, No. 2, Jan. 16, 2020 (Jan. 16, 2020), pp. 1-20, XP068165448, Retrieved from the Internet: URL:https://mentor.ieee.org/802.11/dcn/19/11-19-1925-02-00be-consideration-of-eht-ltf.pptx [retrieved on Jan. 16, 2020] Slides 5-10.

Liu C (Huawei)., et al., "4X EHT—LTF Sequences Design", IEEE Draft, 11-20-1073-02-00BE-4X-EHT-LTF-Sequences-Design, IEEE-SA Mentor, Piscataway, NJ USA, vol. 802.11 EHT, 802.11be, No. 2, Sep. 28, 2020 (Sep. 28, 2020), pp. 1-17, XP068173607, Retrieved from the Internet: URL:https://mentor.ieee.org/802.11/dcn/20/11-20-1073-02-00be-4x-eht-ltf-sequences-design.pptx [retrieved on Sep. 28, 2020] Slides 3-9.

Chun J., et al., "Consideration on EHT-LTF Sequences", Apr. 20, 2020, IEEE 802.11-20/0608r0, pp. 1-20.

Chun J., et al., "EHT-LTF Sequences Considering the New Tone Plan", IEEE 802.11-20/0825r1, Jun. 8, 2020, pp. 1-14.

Liang D., et al., "EHT-LTFs Design", Jan. 20, 2020, IEEE 802.11-20/0117r1, pp. 1-18.

Taiwan Search Report—TW110122758—TIPO—Oct. 7, 2024.

* cited by examiner

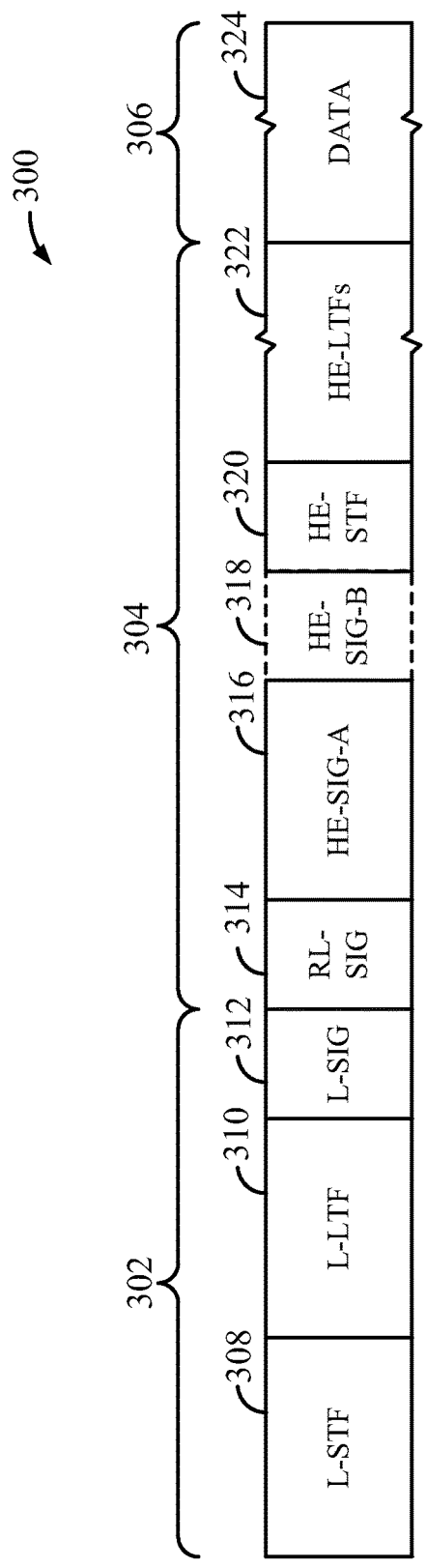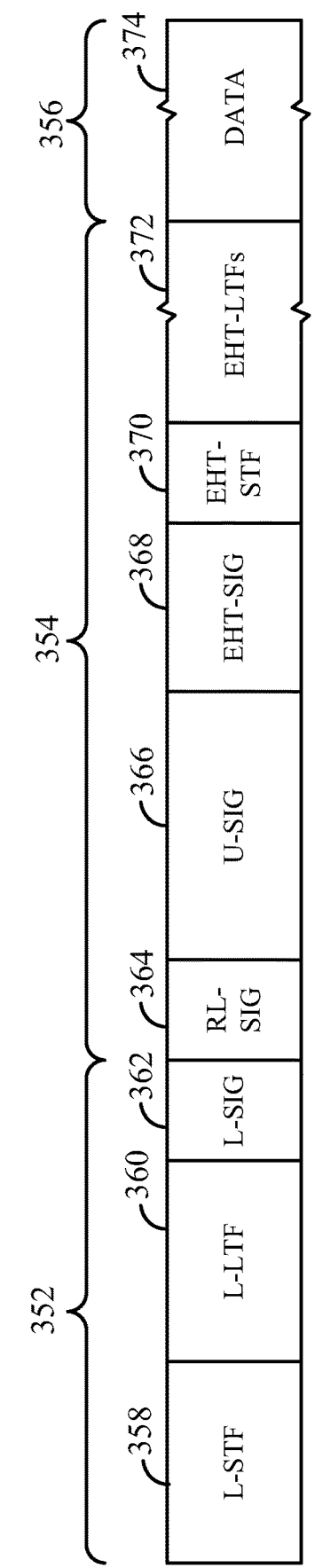

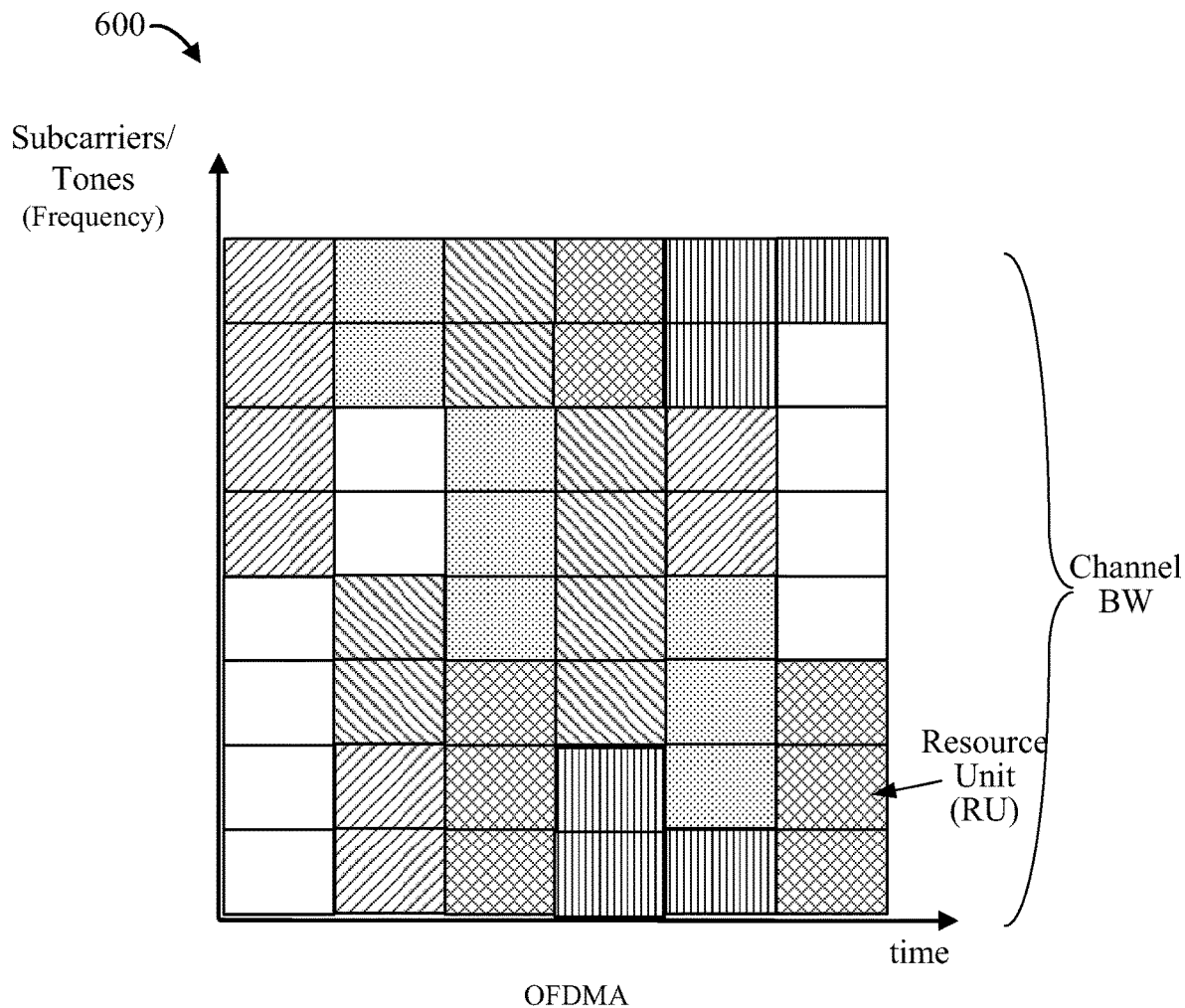
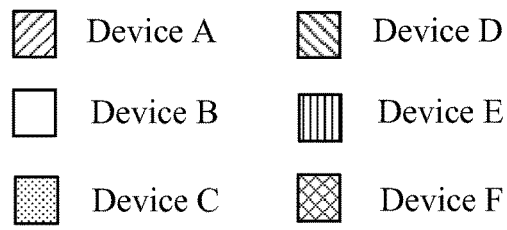
FIG. 6

|  | Sym Dur | Tone Spacing | 80MHz | 160MHz | 320MHz |
|---|---|---|---|---|---|
| Option 1 | 1x | 312.5kHz | 256 | 512 | 1024 |
| Option 2 | 2x | 156.25kHz | 512 | 1024 | 2048 |
| Option 3 | 4x | 78.125kHz | 1024 | 2048 | 4096 |

| FFT Size | 256 | 512 | 1024 | 2048 | 4096 |
|---|---|---|---|---|---|
| Index Range | [-128, 127] | [-256, 255] | [-512, 511] | [-1024, 1023] | [-2048, 2047] |

FIG. 7

$EHT\text{-}LTF_{320MHz\_1x} = \{LTF_{80MHz\_lower1\_1x}, 23 \text{ zeros}, LTF_{80MHz\_upper1\_1x}, 23 \text{ zeros}, LTF_{80MHz\_lower2\_1x}, 23 \text{ zeros}, LTF_{80MHz\_upper2\_1x}\}$

- $LTF_{80MHz\_lower1\_1x} = \{s1*LTF_{80MHz\_left\_1x}, 0, s2*LTF_{80MHz\_right\_1x}\}$
- $LTF_{80MHz\_upper1\_1x} = \{s3*LTF_{80MHz\_left\_1x}, 0, s4*LTF_{80MHz\_right\_1x}\}$
- $LTF_{80MHz\_lower2\_1x} = \{s5*LTF_{80MHz\_left\_1x}, 0, s6*LTF_{80MHz\_right\_1x}\}$
- $LTF_{80MHz\_upper2\_1x} = \{s7*LTF_{80MHz\_left\_1x}, 0, s8*LTF_{80MHz\_right\_1x}\}$ s = [s1 s2 s3 s4 s5 s6 s7 s8]

*EHT-LTF SEQUENCE DESIGN FOR 320 MHZ CHANNEL – 1X SYMBOL DURATION*

FIG. 8

LTF-A Sequence = LTF80MHz_left_1x =

{−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0}

LTF-B Sequence = LTF80MHz_right_1x =

EHT-LTF$_{320MHz\_2x}$ = {LTF$_{80MHz\_lower1\_2x}$, 23 zeros, LTF$_{80MHz\_upper1\_2x}$, 23 zeros, LTF$_{80MHz\_lower2\_2x}$, 23 zeros, LTF$_{80MHz\_upper2\_2x}$}

- LTF$_{80MHz\_lower1\_2x}$ = {q1*LTF$_{80MHz\_part1\_2x}$, q2*LTF$_{80MHz\_part2\_2x}$, q3*LTF$_{80MHz\_part3\_2x}$, q4*LTF$_{80MHz\_part4\_2x}$, q5*LTF$_{80MHz\_part5\_2x}$}

- LTF$_{80MHz\_upper1\_2x}$ = {q6*LTF$_{80MHz\_part1\_2x}$, q7*LTF$_{80MHz\_part2\_2x}$, q8*LTF$_{80MHz\_part3\_2x}$, q9*LTF$_{80MHz\_part4\_2x}$, q10*LTF$_{80MHz\_part5\_2x}$}

- LTF$_{80MHz\_lower2\_2x}$ = {q11*LTF$_{80MHz\_part1\_2x}$, q12*LTF$_{80MHz\_part2\_2x}$, q13*LTF$_{80MHz\_part3\_2x}$, q14*LTF$_{80MHz\_part4\_2x}$, q15*LTF$_{80MHz\_part5\_2x}$}

- LTF$_{80MHz\_upper2\_2x}$ = {q16*LTF$_{80MHz\_part1\_2x}$, q17*LTF$_{80MHz\_part2\_2x}$, q18*LTF$_{80MHz\_part3\_2x}$, q19*LTF$_{80MHz\_part4\_2x}$, q20*LTF$_{80MHz\_part5\_2x}$} q = [q1 q2 q3 q4 q5 q6 q7 q8 q9 q10 q11 q12 q13 q14 q15 q16 q17 q18 q19 q20]

*EHT-LTF SEQUENCE DESIGN FOR 320 MHZ –*
*2X SYMBOL DURATION*

FIG. 10

LTF-A Sequence = $LTF_{80MHz\_part1\_2x}$ =
{+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, −1, 0, +1, 0, −1, 0, −1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, +1, 0, −1, 0, −1, 0, −1, 0, +1, 0, −1, 0, +1, 0, +1, 0, −1, 0, +1, 0}

LTF-B Sequence = $LTF_{80MHz\_par21\_2x}$ =
{+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, +1, 0, +1, 0, +1, 0}

LTF-C Sequence = $LTF_{80MHz\_part3\_2x}$ =
{+1, 0, −1, 0, −1, 0, −1, 0, +1, 0, +1, 0, +1, 0, 0, 0, 0, 0, 0, 0, +1, 0, −1, 0, −1, 0, +1, 0, +1, 0, −1, 0, +1}

LTF-D Sequence = $LTF_{80MHz\_part4\_2x}$ =
{0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, +1, 0, +1, 0, +1, 0, −1, 0, −1, 0, −1, 0, +1, 0, −1, 0, −1, 0, −1, 0, +1, 0, +1, 0, +1, 0, −1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, −1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}

LTF-E Sequence = $LTF_{80MHz\_part5\_2x}$ =
{0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, +1, 0, −1, 0, −1, 0, −1, 0, +1, 0, −1, 0, −1, 0, +1, 0, +1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}

FIG. 11

$EHT\text{-}LTF_{320MHz\_2x} = \{LTF_{80MHz\_lower1\_2x}, 23 \text{ zeros}, LTF_{80MHz\_upper1\_2x}, 23 \text{ zeros}, LTF_{80MHz\_lower2\_2x}, 23 \text{ zeros}, LTF_{80MHz\_upper2\_2x}\}$

- $LTF_{80MHz\_lower1\_2x} = \{q1*LTF_{80MHz\_left\_2x}, 0, q2*LTF_{80MHz\_right\_2x}\}$

- $LTF_{80MHz\_upper1\_2x} = \{q3*LTF_{80MHz\_left\_2x}, 0, q4*LTF_{80MHz\_right\_2x}\}$

- $LTF_{80MHz\_lower2\_2x} = \{q5*LTF_{80MHz\_left\_2x}, 0, q6*LTF_{80MHz\_right\_2x}\}$

- $LTF_{80MHz\_upper2\_2x} = \{q7*LTF_{80MHz\_left\_2x}, 0, q8*LTF_{80MHz\_right\_2x}\}$ q = [q1 q2 q3 q4 q5 q6 q7 q8]

*EHT-LTF SEQUENCE DESIGN FOR 320 MHZ – 2X SYMBOL DURATION*

FIG. 12

LTF-A sequence = $LTF_{80MHz\_left\_2x}$ =

{ -1, 0, -1, 0, -1, 0, -1, 0, -1, 0, 1, 0, 1, 0, -1, 0, -1, 0, 1, 0, -1, 0, 1, 0, -1, 0, -1, 0, -1, 0, -1, 0, -1,
0, -1, 0, 1, 0, 1, 0, 1, 0, 1, 0, -1, 0, 1, 0, -1, 0, 1, 0, 1, 0, -1, 0, -1, 0, -1, 0, -1, 0, -1, 0, 1, 0, 1, 0, -
1, 0, -1, 0, 1, 0, -1, 0, 1, 0, -1, 0, 1, 0, 1, 0, 1, 0, 1, 0, 1, 0, -1, 0, -1, 0, -1, 0, -1, 0, 1, 0, -1, 0, 1,
0, -1, 0, 1, 0, 1, 0, 1, 0, 1, 0, 1, 0, -1, 0, 1, 0, -1, 0, -1, 0, 1, 0, -1, 0, 1, 0, -1, 0, -1, 0, 1, 0, 1, 0, 1,
0, 1, 0, 1, 0, -1, 0, -1, 0, 1, 0, 1, 0, -1, 0, 1, 0, -1, 0, 1, 0, 1, 0, 1, 0, 1, 0, 1, 0, 1, 0, -1, 0, -1, 0, -1,
0, -1, 0, 1, 0, -1, 0, 1, 0, -1, 0, -1, 0, -1, 0, -1, 0, -1, 0, -1, 0, -1, 0, 1, 0, 1, 0, -1, 0, -1, 0, 1, 0, -1,
0, 1, 0, -1, 0, 1, 0, 1, 0, 1, 0, 1, 0, -1, 0, -1, 0, -1, 0, -1, 0, 1, 0, -1, 0, 1, 0, -1, 0, -1, 0, -1, 0,
-1, 0, -1, 0, -1, 0, -1, 0, -1, 0, -1, 0, 1, 0, 1, 0, -1, 0, -1, 0, 1, 0, -1, 0, 1, 0, -1, 0, -1, 0, -1, 0, -1, 0,
-1, 0, -1, 0, 1, 0, -1, 0, 1, 0, 1, 0, -1, 0, 1, 0, -1, 0, 1, 0, 1, 0, 1, 0, 1, 0, 1, 0, 1, 0, 1, 0, -1, 0, -1, 0,
1, 0, 1, 0, -1, 0, 1, 0, -1, 0, 1, 0, -1, 0, -1, 0, -1, 0, -1, 0, -1, 0, 1, 0, -1, 0, 1, 0, 1, 0, -1, 0, 1, 0, -1,
0, 1, 0, 1, 0, 1, 0, 1, 0, 1, 0, 1, 0, -1, 0, -1, 0, 1, 0, 1, 0, -1, 0, 1, 0, -1, 0, 1, 0, -1, 0, -1, 0, -1, 0, -1,
0, -1, 0, -1, 0, 1, 0, 1, 0, -1, 0, -1, 0, 1, 0, -1, 0, -1, 0, 1, 0, -1, 0, 1, 0, -1, 0, -1, 0, -1, 0, -1, 0, -1, 0, 1, 0, -1,
0, 1, 0, 1, 0, -1, 0, 1, 0, -1, 0, 1, 0, 1, 0, -1, 0, -1, 0, -1, 0, -1, 0, -1, 0, 1, 0, 1, 0, -1, 0, -1, 0, 1, 0,
-1, 0, 1, 0, -1, 0, 1, 0, 1, 0, 1, 0, 1, 0, -1, 0, 1, 0, -1, 0, -1, 0, 1, 0, -1, 0, 1, 0, -1, 0, 1, 0, -1,
0, 1, 0, -1, 0, -1, 0, 0, 0}

LTF-B sequence = $LTF_{80MHz\_right\_2x}$ =

EHT-LTF$_{320MHz\_4x}$ = {LTF$_{80MHz\_lower1\_4x}$, 23 zeros, LTF$_{80MHz\_upper1\_4x}$, 23 zeros, LTF$_{80MHz\_lower2\_4x}$, 23 zeros, LTF$_{80MHz\_upper2\_4x}$}

- LTF$_{80MHz\_lower1\_4x}$ = {n1*LTF$_{80MHz\_left\_4x\_1}$, n2*LTF$_{80MHz\_left\_4x\_2}$, 0, n3*LTF$_{80MHz\_right\_4x\_1}$, n4*LTF$_{80MHz\_right\_4x\_2}$}

- LTF$_{80MHz\_upper1\_4x}$ = {n5*LTF$_{80MHz\_left\_4x\_1}$, n6*LTF$_{80MHz\_left\_4x\_2}$, 0, n7*LTF$_{80MHz\_right\_4x\_1}$, n8*LTF$_{80MHz\_right\_4x\_2}$}

- LTF$_{80MHz\_lower2\_4x}$ = {n9*LTF$_{80MHz\_left\_4x\_1}$, n10*LTF$_{80MHz\_left\_4x\_2}$, 0, n11*LTF$_{80MHz\_right\_4x\_1}$, n12*LTF$_{80MHz\_right\_4x\_2}$}

- LTF$_{80MHz\_upper2\_4x}$ = {n13*LTF$_{80MHz\_left\_4x\_1}$, n14*LTF$_{80MHz\_left\_4x\_2}$, 0, n15*LTF$_{80MHz\_right\_4x\_1}$, n16*LTF$_{80MHz\_right\_4x\_2}$} n = [n1 n2 n3 n4 n5 n6 n7 n8 n9 n10 n11 n12 n13 n14 n15 n16]

*EHT-LTF SEQUENCE DESIGN FOR 320 MHZ – 4X SYMBOL DURATION (Alternative 1)*

FIG. 14

LTF-A Sequence = $\text{LTF}_{\text{80MHz\_left\_4x\_1}}$ =
{+1, +1, −1, +1, −1, +1, −1, −1, −1, +1, −1, −1, −1, +1, +1, −1, +1, +1, +1, +1, +1, −1, −1, +1, +1, +1, +1, −1, +1, −1, +1, −1, −1, +1, +1, −1, +1, +1, +1, −1, −1, +1, −1, −1, −1, −1, +1, +1, +1, −1, −1, −1, −1, −1, +1, +1, +1, +1, +1, +1, −1, +1, +1, +1, −1, +1, +1, −1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, −1, −1, +1, +1, +1, +1, −1, −1, +1, +1, +1, +1, +1, −1, +1, +1, −1, −1, −1, +1, −1, −1, −1, +1, −1, +1, −1, +1, +1, −1, +1, −1, +1, +1, −1, +1, −1, +1, +1, −1, +1, +1, +1, −1, +1, +1, +1, −1, −1, +1, −1, −1, +1, +1, −1, −1, −1, −1, +1, −1, +1, −1, +1, +1, −1, −1, +1, −1, −1, −1, +1, +1, −1, +1, +1, +1, +1, −1, −1, −1, +1, +1, +1, +1, −1, +1, +1, +1, +1, +1, +1, +1, −1, +1, +1, +1, −1, +1, +1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, +1, −1, +1, −1, −1, +1, −1, +1, −1, +1, −1, +1, +1}

LTF-B Sequence = $\text{LTF}_{\text{80MHz\_left\_4x\_2}}$ =
{+1, −1, +1, +1, +1, −1, −1, +1, −1, −1, −1, −1, −1, +1, +1, −1, −1, −1, −1, +1, −1, +1, −1, +1, +1, −1, −1, +1, −1, −1, −1, +1, +1, −1, +1, +1, +1, +1, −1, −1, −1, +1, +1, +1, +1, −1, +1, −1, −1, −1, −1, −1, +1, −1, −1, −1, +1, −1, −1, +1, +1, +1, −1, +1, −1, +1, +1, −1, −1, +1, −1, +1, −1, −1, −1, −1, −1, +1, +1, −1, −1, −1, +1, −1, −1, +1, +1, +1, −1, +1, −1, −1, +1, −1, −1, +1, −1, +1, +1, +1, +1, +1, −1, −1, +1, +1, +1, +1, +1, −1, +1, +1, −1, −1, −1, +1, −1, −1, −1, +1, −1, +1, −1, +1, +1, −1, +1, −1, +1, +1, +1, −1, +1, +1, +1, −1, −1, +1, −1, −1, −1, −1, −1, +1, +1, −1, −1, −1, −1, +1, −1, +1, −1, +1, +1, −1, −1, +1, −1, −1, −1, +1, +1, −1, +1, +1, +1, +1, −1, −1, −1, +1, +1, +1, +1, −1, −1, +1, +1, +1, +1, +1, +1, −1, +1, +1, +1, −1, −1, −1, +1, −1, +1, −1, −1, +1, +1, −1, +1, −1, +1, +1, +1, +1, −1, −1, +1, +1, +1, −1, +1, +1, +1, −1, −1, −1, +1, −1, +1, +1, −1, +1, +1, +1, −1, +1, +1, +1, +1, −1, −1, −1, +1, −1, +1, +1, +1, −1, −1, +1, +1, +1, −1, +1, −1, −1, −1, +1, −1, +1, −1, −1, −1, −1, +1, +1, +1, −1, −1, +1, 0, 0}

LTF-C Sequence = $\text{LTF}_{\text{80MHz\_right\_4x\_1}}$ =
{0, 0, +1, −1, −1, −1, −1, −1, −1, +1, −1, +1, +1, −1, −1, +1, +1, −1, +1, −1, +1, +1, −1, −1, +1, −1, +1, −1, −1, −1, +1, +1, −1, +1, +1, +1, −1, +1, +1, +1, +1, +1, +1, +1, −1, +1, −1, −1, +1, −1, −1, +1, −1, +1, +1, +1, −1, −1, +1, −1, −1, −1, +1, +1, −1, −1, −1, −1, −1, +1, −1, −1, −1, −1, −1, +1, +1, −1, −1, −1, −1, +1, −1, −1, +1, +1, +1, −1, +1, +1, +1, −1, +1, −1, +1, −1, −1, −1, −1, −1, +1, +1, +1, −1, −1, −1, +1, −1, −1, +1, +1, +1, −1, +1, +1, −1, −1, +1, −1, +1, −1, −1, −1, −1, −1, +1, −1, −1, +1, +1, −1, −1, −1, +1, −1, −1, +1, +1, +1, −1, +1, −1, −1, +1, −1, −1, +1, −1, +1, +1, +1, −1, +1, −1, −1, +1, +1, −1, +1, −1, +1, +1, +1, −1, −1, −1, −1, +1, −1, −1, −1, −1, −1, −1, −1, +1, −1, +1, +1, −1, −1, −1, +1, +1, −1, +1, +1, +1, +1, −1, +1, +1, −1, +1, +1, −1, +1, +1, −1, −1, −1, +1, +1, −1, +1, +1, +1, −1, −1, +1, +1, +1, +1, +1, −1, +1, −1, −1, −1, −1, +1, +1, −1, −1, −1, −1, −1, +1, −1, −1, +1, +1, +1, −1, +1, +1, +1, −1, +1, −1, +1, −1, −1, −1, −1, −1, +1, +1, +1, −1, −1, −1, −1, +1, −1, −1, +1, +1, +1, −1, +1, +1, −1, +1}

LTF-D Sequence = $\text{LTF}_{\text{80MHz\_right\_4x\_2}}$ =
{+1, −1, −1, +1, −1, +1, −1, +1, +1, +1, −1, +1, −1, −1, +1, +1, −1, +1, −1, +1, +1, +1, −1, −1, +1, −1, −1, −1, +1, −1, −1, −1, −1, −1, −1, −1, +1, −1, +1, +1, −1, +1, +1, −1, +1, −1, −1, −1, +1, +1, −1, +1, +1, +1, −1, −1, +1, +1, +1, +1, +1, −1, +1, +1, +1, +1, +1, −1, −1, +1, +1, +1, +1, −1, +1, +1, −1, −1, −1, +1, −1, −1, −1, +1, −1, +1, −1, +1, +1, +1, +1, −1, −1, −1, +1, +1, +1, +1, −1, +1, +1, −1, −1, −1, +1, −1, −1, +1, +1, −1, +1, −1, −1, −1, −1, −1, −1, −1, −1, −1, +1, −1, −1, −1, +1, −1, −1, +1, +1, −1, +1, −1, −1, +1, −1, −1, +1, −1, +1, −1, +1, +1, −1, +1, −1, −1, +1, +1, +1, −1, +1, −1, −1, −1, +1, −1, −1, +1, −1, −1, +1, −1, +1, +1, +1, +1, +1, +1, +1, −1, +1, −1, −1, −1, −1, +1, +1, −1, +1, +1, +1, +1, +1, −1, −1, +1, +1, +1, +1, −1, +1, −1, −1, −1, −1, +1, +1, −1, −1, −1, −1, −1, +1, −1, −1, +1, +1, +1, −1, +1, −1, +1, +1, +1, +1, −1, −1, +1, +1, +1, +1, +1, −1, +1, −1, −1, −1, −1, +1, −1, −1, −1, −1, +1, −1, +1, −1, +1, −1, −1, −1, −1, +1, −1, −1, +1, +1, −1, +1, +1, −1, −1, +1, −1, +1, −1, +1}

FIG. 15

$\text{EHT-LTF}_{320\text{MHz}\_4x} = \{\text{LTF}_{80\text{MHz\_lower1}\_4x}, 23 \text{ zeros}, \text{LTF}_{80\text{MHz\_upper1}\_4x}, 23 \text{ zeros}, \text{LTF}_{80\text{MHz\_lower2}\_4x}, 23 \text{ zeros}, \text{LTF}_{80\text{MHz\_upper2}\_4x}\}$

- $\text{LTF}_{80\text{MHz\_lower1}\_4x} = \{n1*\text{LTF}_{80\text{MHz\_left}\_4x}, 0, n2*\text{LTF}_{80\text{MHz\_right}\_4x}\}$

- $\text{LTF}_{80\text{MHz\_upper1}\_4x} = \{n3*\text{LTF}_{80\text{MHz\_left}\_4x}, 0, n4*\text{LTF}_{80\text{MHz\_right}\_4x}\}$

- $\text{LTF}_{80\text{MHz\_lower2}\_4x} = \{n5*\text{LTF}_{80\text{MHz\_left}\_4x}, 0, n6*\text{LTF}_{80\text{MHz\_right}\_4x}\}$

- $\text{LTF}_{80\text{MHz\_upper2}\_4x} = \{n7*\text{LTF}_{80\text{MHz\_left}\_4x}, 0, n8*\text{LTF}_{80\text{MHz\_right}\_4x}\}$ $n = [n1\ n2\ n3\ n4\ n5\ n6\ n7\ n8]$

*EHT-LTF SEQUENCE DESIGN FOR 320 MHZ –  
4X SYMBOL DURATION (Alternative 2)*

FIG. 16

LTF-A Sequence = $LTF_{80MHz\_left\_4x}$ =

{+1, +1, −1, +1, −1, +1, −1, −1, −1, +1, −1, −1, −1, +1, +1, −1, +1, +1, +1, +1, +1, −1, −1, +1, +1, +1, +1, −1, +1, −1, +1, −1, −1, +1, +1, −1, +1, +1, +1, −1, −1, +1, −1, −1, −1, −1, +1, +1, +1, −1, −1, −1, −1, −1, +1, +1, +1, +1, +1, +1, −1, +1, +1, +1, −1, +1, +1, −1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, −1, −1, +1, +1, +1, +1, −1, −1, +1, +1, +1, +1, +1, −1, +1, +1, −1, −1, −1, +1, −1, −1, −1, +1, −1, +1, −1, +1, +1, −1, +1, −1, +1, −1, +1, +1, +1, −1, +1, +1, +1, −1, −1, +1, −1, −1, −1, −1, −1, +1, +1, −1, −1, −1, −1, +1, −1, +1, −1, +1, +1, −1, +1, +1, +1, +1, −1, −1, −1, +1, +1, +1, +1, −1, +1, +1, +1, +1, +1, +1, +1, −1, +1, +1, +1, −1, +1, +1, −1, −1, +1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, +1, −1, +1, −1, −1, +1, −1, +1, −1, +1, −1, +1, +1, +1, −1, +1, +1, +1, −1, −1, +1, −1, −1, −1, −1, −1, +1, +1, −1, −1, −1, −1, +1, −1, +1, −1, +1, +1, −1, −1, +1, −1, −1, +1, +1, −1, +1, +1, +1, +1, −1, −1, −1, +1, +1, +1, +1, −1, +1, −1, −1, −1, −1, −1, −1, +1, −1, −1, −1, +1, −1, −1, +1, +1, +1, −1, +1, −1, +1, +1, −1, −1, +1, −1, +1, −1, −1, −1, −1, −1, +1, +1, −1, −1, −1, +1, −1, −1, +1, +1, +1, −1, +1, −1, −1, +1, −1, −1, +1, −1, +1, +1, +1, +1, +1, +1, −1, −1, +1, +1, +1, +1, +1, −1, +1, +1, −1, −1, −1, +1, −1, −1, −1, +1, −1, +1, −1, +1, −1, +1, +1, −1, +1, −1, +1, −1, +1, +1, +1, +1, −1, +1, +1, +1, −1, −1, +1, −1, −1, −1, −1, −1, +1, +1, −1, −1, −1, −1, +1, −1, +1, −1, +1, −1, +1, +1, −1, +1, −1, +1, +1, +1, +1, +1, −1, −1, +1, +1, +1, −1, +1, +1, −1, +1, −1, −1, +1, −1, −1, −1, +1, −1, −1, −1, +1, +1, −1, −1, −1, +1, +1, −1, −1, +1, +1, +1, −1, +1, −1, −1, +1, −1, +1, −1, +1, +1, +1, −1, +1, +1, +1, +1, +1, +1, +1, −1, +1, +1, −1, −1, −1, +1, −1, −1, −1, +1, −1, +1, −1, +1, −1, +1, −1, +1, −1, +1, +1, +1, +1, +1, +1, −1, −1, +1, +1, +1, +1, +1, −1, −1, +1, +1, +1, −1, +1, +1, −1, −1, −1, +1, −1, +1, +1, −1, +1, +1, −1, +1, −1, −1, −1, −1, +1, +1, +1, −1, −1, +1, 0, 0}

LTF-B Sequence = $LTF_{80MHz\_right\_4x}$ =

LONG TRAINING FIELD WITH REDUCED PEAK-TO-AVERAGE POWER RATIO

CROSS-REFERENCE TO RELATED APPLICATIONS

The application claims priority to and the benefit of U.S. provisional patent application No. 63/042,557 filed on Jun. 22, 2020, U.S. provisional patent application No. 63/046,569 filed on Jun. 30, 2020, and U.S. provisional patent application No. 63/051,264 filed on Jul. 13, 2020, the entire content of which is incorporated herein by reference as if fully set forth below in its entirety and for all applicable purposes.

TECHNICAL FIELD

The present disclosure relates generally to wireless communication, and more particularly, to training fields for communications over large bandwidth channels that may achieve reduced peak-to-average power ratios.

DESCRIPTION OF THE RELATED TECHNOLOGY

As wireless communications have been evolving toward ever increasing data rates, the Institute of Electrical and Electronic Engineers (IEEE) has been evolving its IEEE 802.11 standard to provide increased throughput. Recently, IEEE 802.11be is being developed, which defines Extreme High Throughput (EHT) wireless communications using large bandwidth channels (for example, having a bandwidth of 240 MHz, 320 MHz, or larger). The total channel bandwidth may be comprised of a combination of subchannels (potentially having different sizes) in one or more frequency bands (such as the 5 GHz or 6 GHz frequency bands). The subchannels, which may be contiguous or non-contiguous in the frequency band, may be collectively referred to as a wireless channel. IEEE 802.11be proposes to transmit signals using orthogonal frequency-division multiple access (OFDMA) which is a multi-user version of the orthogonal frequency-division multiplexing (OFDM) digital modulation scheme. OFDM employs multi-carrier modulation where a plurality of carriers (for example, parallel subcarriers), each carrying low bit rate data, are orthogonal to each other. In OFDMA, multiple access is achieved by assigning subsets of subcarriers to individual users or devices.

OFDMA transmissions can have high peak values in the time domain since many subcarrier components are added via an inverse fast Fourier transformation (IFFT) operation. Consequently, OFDMA transmissions may have a high peak-to-average power ratio (PAPR) when compared to single-carrier transmissions. The high PAPR is one of the most detrimental aspects in an OFDMA system as it decreases the signal-to-quantization noise ratio (SQNR) of the analog-digital convertor (ADC) and digital-analog convertor (DAC) while degrading the efficiency of the power amplifier in the transmitter. According to the IEEE 802.11 standards, a physical layer preamble of a wireless communication transmission includes one or more long training field (LTF). Each LTF includes a training sequence that can be used by a receiving device to set or adjust an automatic gain control (AGC) function of the receiving device. AGC is a technique in an amplifier or chain of amplifiers used to adjust the signal amplitude at its output regardless of the variation of the signal amplitude at the input. The LTF may include a training sequence of predetermined signals that can be used to identify the beginning of the transmission and to set the AGC. However, a high PAPR tends to skew the AGC incorrectly, making it difficult to demodulate/detect control or data channels.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect provides a method for wireless communication by a wireless communication device. A data field for transmission is generated using a first channel having a 320 MHz or 240 MHz total channel bandwidth. A long training field (LTF) sequence is obtained that is based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio. A wireless packet is then transmitted that includes the LTF and the data field to at least one second wireless communication device via the first channel. Each of the plurality of LTF subsequences may be based on a High Efficiency (HE) LTF (HE-LTF) sequence for a subchannel having an 80 MHz channel bandwidth.

In one example, a symbol duration of each symbol of the LTF sequence may be one-fourth as long as a symbol duration of each symbol of the data field. For instance, the symbol duration of each symbol of the LTF sequence may be 3.2 µs plus a guard interval and the symbol duration of each symbol of the data field may be 12.8 µs plus the guard interval. The concatenation may be a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences. The selectively phase-rotated one or more of the plurality of LTF subsequences may be based on a set of phase rotation values s=[s1 s2 s3 s4 s5 s6 s7 s8] to the plurality of LTF subsequences, and each of the LTF subsequences is based on a first LTF base sequence LTF-A and a second LTF base sequence LTF-B. In one example, the first LTF subsequence={s1*LTF-A, 0, s2*LTF-B}; the second LTF subsequence={s3*LTF-A, 0, s4*LTF-B}; the third LTF subsequence={s5*LTF-A, 0, s6*LTF-B}; and the fourth LTF subsequence={s7*LTF-A, 0, s8*LTF-B}, where the set of phase rotation values s=[s1 s2 s3 s4 s5 s6 s7 s8]=[1 1 1 1 −1 −1 −1 −1].

In another example, a symbol duration of each symbol of the LTF sequence may be half as long as a symbol duration of each symbol of the data field. For instance, the symbol duration of each symbol of the LTF sequence may be 6.4 µs plus a guard interval and the symbol duration of each symbol of the data field may be 12.8 µs plus the guard interval. The concatenation may be a sequence formed by concatenating, in any order, a first LTF subsequence of the plurality of subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences. The selectively phase-rotated one or more of the plurality of LTF subsequences may be based on a set of phase rotation values q=[q1 q2 q3 q4 q5 q6 q7 q8 q9 q10 q11 q12 q13 q14 q15 q16 q17 q18 q19 q20] to the plurality of LTF subsequences, and where each of the LTF subsequences is based on a first LTF base sequence LTF-A, a second LTF base sequence LTF-B, a third LTF base sequence LTF-C, a fourth LTF base sequence LTF-D, and a fifth LTF base sequence LTF-E. In one example, the first LTF subsequence={q1*LTF-A, q2*LTF-B, q3*LTF-C, q4*LTF-D, q5*LTF-E}, the second LTF subsequence={q6*LTF-A, q7*LTF-B, q8*LTF-C, q9*LTF-D, q10*LTF-E}, the third LTF subsequence={q11*LTF-A, q12*LTF-B, q13*LTF-C, q14*LTF-D, q15*LTF-E}, and the fourth LTF subsequence={q16*LTF-A, q17*LTF-B, q18*LTF-C, q19*LTF-D, q20*LTF-E}, where the set of phase rotation values q=[q1 q2 q3 q4 q5 q6 q7 q8 q9 q10 q11 q12 q13 q14 q15 q16 q17 q18 q19 q20]=[+1 −1 −1 −1 +1 −1 +1 +1 +1 −1 −1 +1 +1 −1 −1 +1 −1 −1 +1 +1] or [+1 +1 −1 −1 −1 −1 −1 −1 −1 +1 +1 +1 +1 +1 +1 +1 +1 +1].

In yet another example, a symbol duration of each symbol of the LTF sequence may be the same as a symbol duration of each symbol of the data field. For instance, the symbol duration of each symbol of the LTF sequence may be 12.8 μs plus a guard interval and the symbol duration of each symbol of the data field may be 12.8 μs plus the guard interval. The concatenation may be a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences. The selectively phase-rotated one or more of the plurality of LTF subsequences may be based on a set of phase rotation values n=[n1 n2 n3 n4 n5 n6 n7 n8 n9 n10 n11 n12 n13 n14 n15 n16] to the plurality of LTF subsequences, and each of the LTF subsequences being based on a first LTF base sequence LTF-A, a second LTF base sequence LTF-B, a third LTF base sequence LTF-C, and a fourth LTF base sequence LTF-D. In one example, the first LTF ={n1*LTF-A, n2*LTF-B, 0, n3*LTF-C, n4*LTF-D}; the second LTF={n5*LTF-A, n6*LTF-B, 0, n7*LTF-C, n8*LTF-D}; the third LTF={n9*LTF-A, n10*LTF-B, 0, n11*LTF-C, n12*LTF-D}; and the fourth LTF={n13*LTF-A, n14*LTF-B, 0, n15*LTF-C, n16*LTF-D}, where the set of phase rotation values n=[n1 n2 n3 n4 n5 n6 n7 n8 n9 n10 n11 n12 n13 n14 n15 n16]=[1 −1 1 −1 1 −1 −1 1 1 1 −1 −1 1 1 1 1] or [1 −1 −1 1 1 −1 1 −1 1 1 1 1 1 −1 −1].

In an alternative example, a symbol duration of each symbol of the LTF sequence may be the same as a symbol duration of each symbol of the data field. For instance, the symbol duration of each symbol of the LTF sequence may be 12.8 μs plus a guard interval and the symbol duration of each symbol of the data field may be 12.8 μs plus the guard interval. The concatenation may be a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LFT subsequences. The selectively phase-rotated one or more of the plurality of LTF subsequences may be based on a set of phase rotation values n=[n1 n2 n3 n4 n5 n6 n7 n8] to the plurality of LTF subsequences, each of the LTF subsequences being based on a first LTF base sequence LTF-A and a second LTF base sequence LTF-B. In one example, the first LTF subsequence={n1*LTF-A, 0, n2*LTF-B}; the second LTF subsequence={n3*LTF-A, 0, n4*LTF-B}; the third LTF subsequence={n5*LTF-A, 0, n6*LTF-B}; and the fourth LTF subsequence={n7*LTF-A, 0, n8*LTF-B}, where the set of phase rotation values n=[n1 n2 n3 s4 n5 n6 n7 n8]=[1 −1 −1 −1 −1 1 1 1].

In yet another example, each of the plurality of LTF subsequences may be based on an 80 MHz LTF segment formed from two High Efficiency (HE) LTF (HE-LTF) sequences for subchannels having a 40 MHz channel bandwidth. The 80 MHz LTF segment may be formed by interleaving and phase rotating values of four base subsegments Sa, Sb, Sc, and Sd, where
  Sa=[+1 +1 +1 +1 +1 −1 −1 +1 +1 −1 +1 −1 +1],
  Sb=[Sa(1:7), −Sa(8:13)],
  Sc=[−Sa(1:6), Sa(7:13)], and
  Sd=[Sd(1:14)], where the values Sd(x) are configured to reduce a peak-to-average power ratio in an 80 MHz segment. In one example, Sd=[−1, −1, −1, −1, 1, −1, −1, −1, 1, 1, 1, −1, −1, −1].
The symbol duration of each symbol of the LTF sequence may be half as long as a symbol duration of each symbol of the data field, and the concatenation may be a sequence formed by concatenating, in any order, a first LTF subsequence of the plurality of subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences. The symbol duration of each symbol of the LTF sequence may be 6.4 μs plus a guard interval and the symbol duration of each symbol of the data field may be 12.8 μs plus the guard interval. The selectively phase-rotated one or more of the plurality of LTF subsequences may be based on a set of phase rotation values q=[q1 q2 q3 q4 q5 q6 q7 q8] applied to the plurality of LTF subsequences, each of the LTF subsequences being based on a first LTF base sequence LTF-A and a second LTF base sequence LTF-B. In one example, the first LTF subsequence={q1*LTF-A, 0, q2*LTF-B}, the second LTF subsequence={q3*LTF-A, 0, q4*LTF-B}, the third LTF subsequence={q5*LTF-A, 0, q6*LTF-B}, and the fourth LTF subsequence={q7*LTF-A, 0, q8*LTF-B}, where the set of phase rotation values q=[q1 q2 q3 q4 q5 q6 q7 q8]=[1 1 1 1 −1 −1 −1 1].

Yet another aspect provides a method for receiving wireless communications. In particular, a wireless packet that includes a long training field (LTF) sequence and a data field may be received via a first channel having a 320 MHz or 240 MHz total channel bandwidth. The LTF sequence may then be detected within the packet, the LTF sequence based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio. The data field may be received or obtained based on the detected LTF sequence.

These and other aspects of the present disclosure will become more fully understood upon a review of the detailed description, which follows. Other aspects, features, and examples will become apparent to those of ordinary skill in the art, upon reviewing the following description of specific, example implementations in conjunction with the accompanying figures. While features of the present examples may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while example implementations may be discussed below as a device, system, or method it should be understood that such example implementations can be implemented in various devices, systems, and methods.

BRIEF DESCRIPTION OF THE DRAWINGS

FIG. 3A shows an example physical layer convergence protocol PDU (PPDU) usable for wireless communication between an access point and one or more stations.

FIG. 3B shows another example PPDU usable for wireless communication between an access point and one or more stations.

FIG. 6 illustrates examples of OFDMA resource unit (RU) allocations.

FIG. 7 illustrates examples of tone spacings and index ranges for various fast Fourier transform (FFT) sizes and symbol durations for 80 MHz, 160 MHz, and 320 MHz transmissions.

FIG. 8 illustrates an example of an Extreme High Throughput (EHT) long training field (LTF) (EHT-LTF) construction for a 320 MHz bandwidth channel, where each symbol of the EHT-LTF uses a 1x symbol duration and each symbol of a data field uses a 4x symbol duration.

FIG. 9 illustrates examples of High Efficiency (HE) LTF (HE-LTF) subsequences for an 80 MHz bandwidth channel including a first LTF base sequence and a second LTF base sequence.

FIG. 10 illustrates an example of an EHT-LTF construction for a 320 MHz bandwidth channel, where each symbol of the EHT-LTF uses a 2x symbol duration and each symbol of a data field uses a 4x symbol duration.

FIG. 11 illustrates examples of HE-LTF subsequences for an 80 MHz bandwidth channel including a first LTF base sequence, a second LTF base sequence, a third LTF base sequence, a fourth LTF base sequence, and a fifth LTF base sequence.

FIG. 12 illustrates another example of an EHT-LTF construction for a 320 MHz bandwidth channel, where each symbol of the EHT-LTF uses a 2x symbol duration and each symbol of a data field uses a 4x symbol duration.

FIG. 13 illustrates examples of HE-LTF subsequences for an 80 MHz bandwidth channel including a first LTF base sequence LTF-A and a second LTF base sequence LTF-B.

FIG. 14 illustrates a first example of an EHT long training field (LTF) construction for a 320 MHz bandwidth channel, where each symbol of the EHT-LTF uses a 4x symbol duration and each symbol of a data field uses a 4x symbol duration.

FIG. 15 illustrates examples of HE-LTF subsequences for an 80 MHz bandwidth channel including a first LTF base sequence, a second LTF base sequence, a third base sequence, and a fourth base sequence.

FIG. 16 illustrates a second example of an EHT long training field (LTF) construction for a 320 MHz bandwidth channel, where each symbol of the EHT-LTF uses a 4x symbol duration and each symbol of a data field uses a 4x symbol duration.

FIG. 17 illustrates examples of HE-LTF subsequences for an 80 MHz bandwidth channel including a first LTF base sequence and a second LTF base sequence.

DETAILED DESCRIPTION

Figure 1:
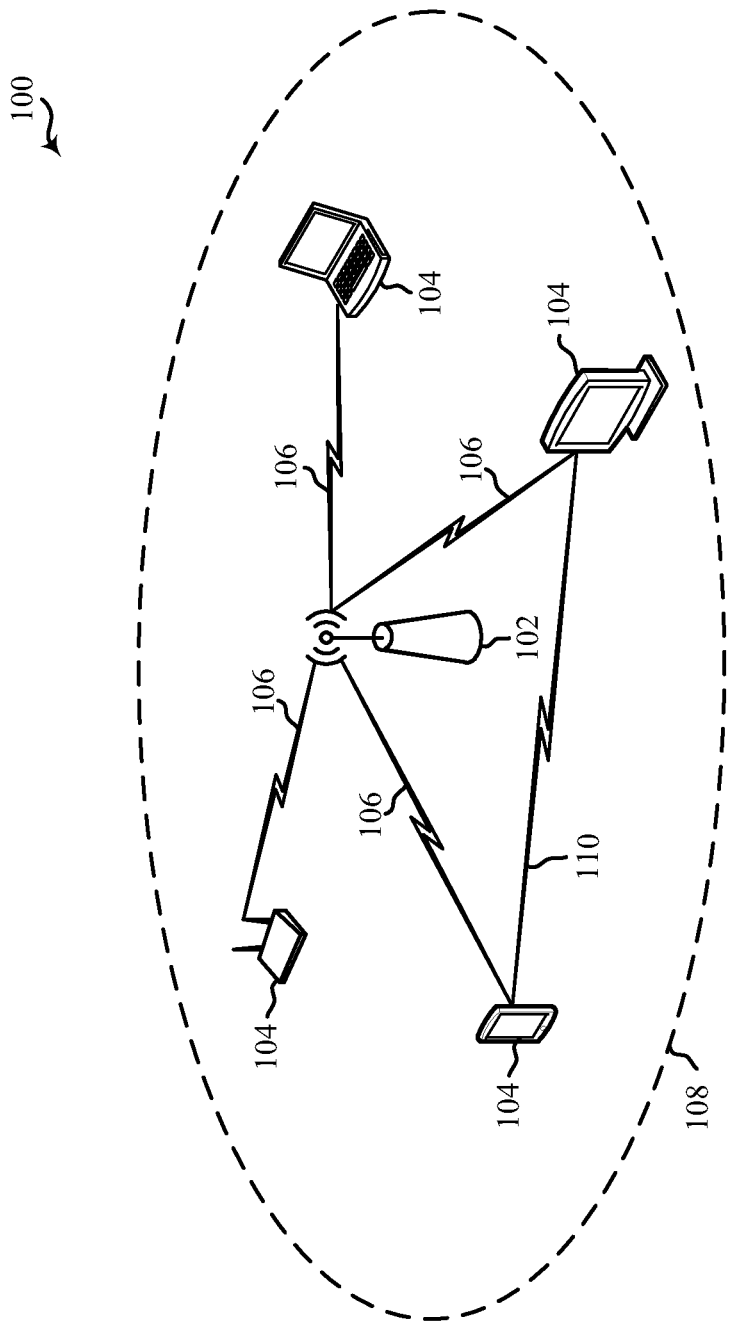
FIG. 1 shows a block diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (TOT) network.

As the IEEE 802.11 standards evolve to use higher bandwidths (for example, 320 MHz for Extreme High Throughput (EHT) operation as defined by the IEEE 802.11be amendment), it has been recognized that OFDMA transmissions can have high peak values in the time domain since many subcarrier components are added via an inverse fast Fourier transformation (IFFT) operation. Consequently, OFDMA transmissions may have a high peak-to-average power ratio (PAPR) when compared to single-carrier transmissions. The high PAPR of OFDMA transmissions decreases the signal-to-quantization noise ratio (SQNR) of the analog-digital convertor (ADC) and digital-analog convertor (DAC) in a radio chain while degrading the efficiency of the power amplifier in a transmitter.

According to the IEEE 802.11 standards, a physical layer preamble of a wireless communication transmission includes one or more long training fields (LTFs). For example, an EHT transmission includes a legacy LTF (L-LTF) and an EHT LTF (EHT-LTF). Each of the LTFs includes a training sequence of predetermined signals that can be used by a receiving device to identify the beginning of a transmission and for various other purposes. For instance, the EHT LTF may be specifically configured for channel estimation, automatic gain control (AGC), and other operations. This enables a receiving device to perform coherent demodulation/detection of the control or data channels.

Various aspects relate generally to an LTF constructed to minimize or reduce the peak-to-average-power ratio (PAPR) of the LTF. Some aspects more specifically relate to reutilizing a High Efficiency (HE)-LTF sequence defined by the IEEE 802.11ax amendment for 80 MHz bandwidth channels as a basis to construct a longer EHT-LTF sequence for 320 MHz bandwidth channels. In order to minimize the PAPR of the EHT-LTF for 320 MHz bandwidth channels, the HE-LTF for 80 MHz bandwidth channels may be modified based on phase rotations and concatenations to achieve a minimized PAPR or otherwise a PAPR below a threshold level. One or more combinations of phase rotation coefficients and HE-LTF segments that provide such minimized or reduced PAPR may be predetermined or preconfigured. In another aspect, an EHT-LTF sequence may be optimized to reduce the PAPR based on multi-stream PAPR minimization for different resource unit (RU) or multi-RU (MRU) sizes.

Particular aspects of the subject matter described in this disclosure can be implemented to realize one or more of the following potential advantages. For large bandwidth channels using OFDMA modulation, it is advantageous to configure the LTF to minimize or reduce the peak-to-average-power ratio (PAPR) of the LTF so that the LTF does not skew the AGC incorrectly. This allows a receiving device to perform coherent demodulation/detection of control or data channels. In one aspect, such LTF may be pre-generated and stored, so that it does not have to be dynamically generated every time.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
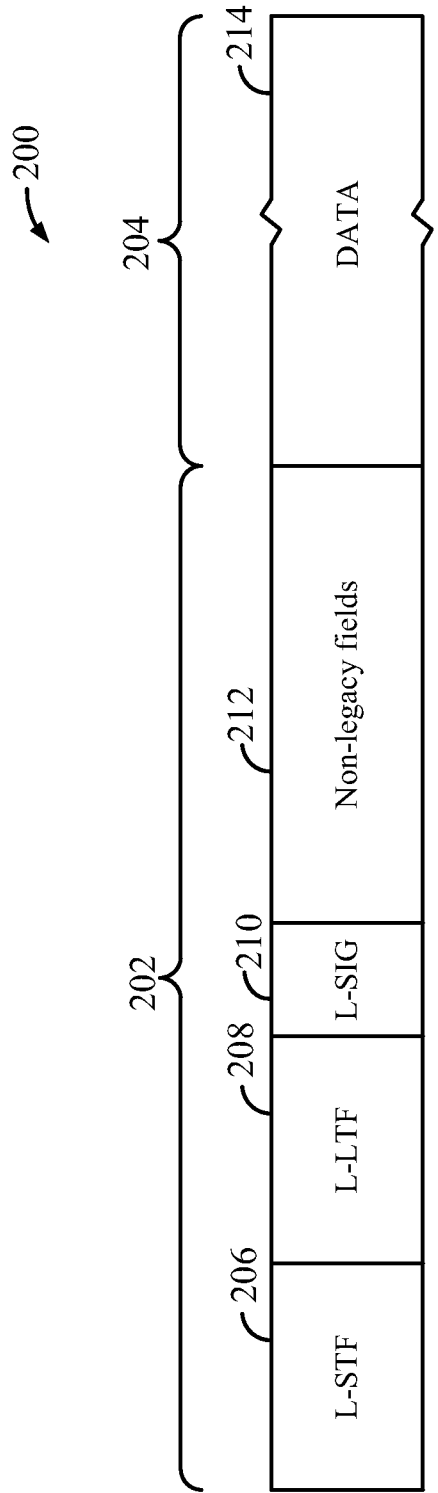
FIG. 2A shows an example protocol data unit (PDU) usable for wireless communication between an access point and one or more stations.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
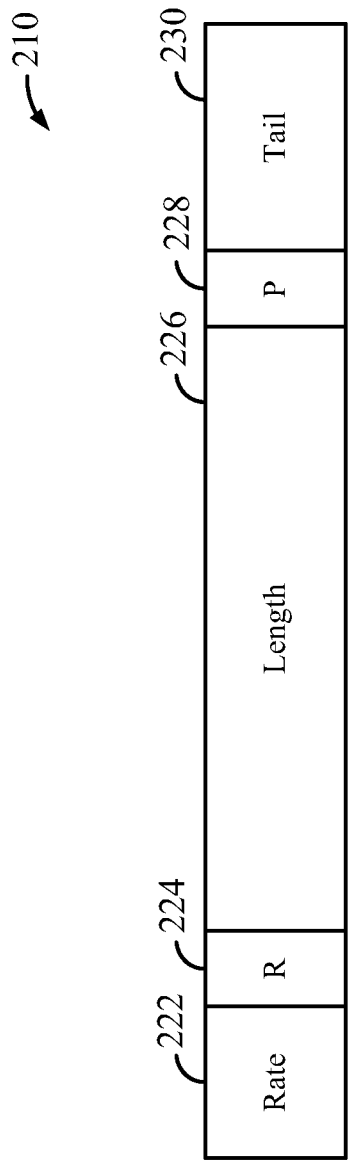
FIG. 2B shows an example L-SIG in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374.

Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 72 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Certain aspects of the present disclosure may support allowing APs 104 to allocate STAs 106 transmissions in optimized ways to improve efficiency. Both high efficiency wireless (HEW) stations, stations utilizing an 802.11 high efficiency protocol (such as IEEE 802.11ax), and stations using older or legacy 802.11 protocols (such as 802.11b), can compete or coordinate with each other in accessing a wireless medium.

In some implementations, APs 104 can transmit on a wireless medium according to various DL tone plans for HEW STAs. For example, with respect to FIG. 1, the STAs 106A-106D can be HEW STAs. In some implementations, the HEW STAs can communicate using a symbol duration four times that of a legacy STA. Accordingly, each symbol which is transmitted may be four times as long in duration. When using a longer symbol duration, each of the individual tones may use one-quarter as much bandwidth to be transmitted. For example, in various implementations, a 1x symbol duration can be 3.2 µs, a 2x symbol duration can be 6.4 µs, and a 4x symbol duration can be 12.8 µs. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Figure 4:
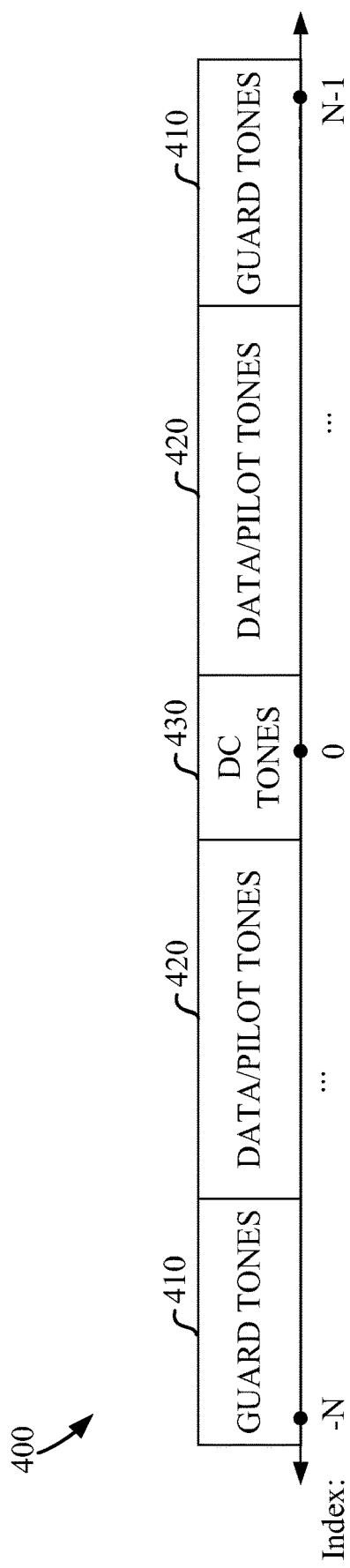
FIG. 4 shows an example 2N-tone plan.

FIG. 4 shows an example 2N-tone plan 400. In some implementations, the tone plan 400 may correspond to OFDM tones, in the frequency domain, generated using a 2N-point fast Fourier transform (FFT). The tone plan 400 includes 2N OFDM tones indexed −N to N−1. The tone plan 400 includes two sets of edge or guard tones 410, two sets of data/pilot tones 420, and a set of direct current (DC) tones 430. In some implementations, the edge or guard tones 410 and DC tones 430 can be null. In some implementations, the tone plan 400 may include another suitable number of pilot tones or may include pilot tones at other suitable tone locations.

In some aspects, OFDMA tone plans may be provided for transmission using a 4x symbol duration, as compared to various IEEE 802.11 protocols. For example, 4x symbol duration may use a number of symbols which can be each 12.8 µs in duration (different from symbols in certain other IEEE 802.11 protocols which may be 3.2 µs in duration).

In some aspects, OFDMA tone plans may be provided for transmission using a 2x symbol duration, as compared to various IEEE 802.11 protocols. For example, the 2x symbol duration may use a number of symbols which can be each 6.4 µs in duration (different from symbols in certain other IEEE 802.11 protocols which may be 3.2 µs or 12.8 µs in duration).

In some aspects, the data/pilot tones 420 of a transmission 400 may be divided among any number of different users. For example, the data/pilot tones 420 may be divided among between one and eight users. In order to divide the data/pilot tones 420, an AP 104 or another device may signal to the various devices, indicating which devices may transmit or receive on which tones (of the data/pilot tones 420) in a particular transmission. Accordingly, systems and methods for dividing the data/pilot tones 420 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, 80, 160, 240, or 320 MHz (or a combination thereof), and it may be desirable to use a tone plan that can be used for any of these bandwidths. Further, a tone plan may be simple in that it uses a smaller number of building block sizes. For example, a tone plan may contain a unit which may be referred to as resource unit (RU). This unit may be used to assign a particular amount of wireless resources (for example, bandwidth or particular tones) to a particular user. For example, one user may be assigned bandwidth as a number of RUs, and the data/pilot tones 420 of a transmission may be broken up into a number of RUs.

A tone plan also may be chosen based on efficiency. For example, transmissions of different bandwidths (for example, 20, 40, 80, 160, 240, or 320 MHz, or a combination thereof) may have different numbers of tones. Reducing the number of leftover tones may be beneficial. Further, it may be beneficial if a tone plan is configured to preserve 20, 40, 80, 160, 240, or 320 MHz boundaries in some implementations. For example, it may be desirable to have a tone plan which allows each 20, 40, 80, 160, 240, or 320 MHz portion to be decoded separately from each other, rather than having allocations which can be on the boundary between two different 20, 40, 80, 160, 240, or 320 MHz portions of the bandwidth. For example, it may be beneficial for interference patterns to be aligned with 20, 40, 80, 160, 240, or 320 MHz channels. Further, it may be beneficial to have channel bonding, which also may be known as preamble puncturing, such that when a 20 MHz transmission and a 40 MHz transmission can be transmitted, to create a 20 MHz "hole" in the transmission when transmitted over 80, 160, 240, or 320 MHz. This may allow, for example, a legacy packet to be transmitted in this unused portion of the bandwidth. This puncturing may apply to any transmission (for example, 20, 40, 80, 160, 240, or 320 MHz transmissions) and may create "holes" of at least 20 MHz in the transmission regardless of the channel or bandwidth being used. Finally, it also may be advantageous to use a tone plan which provides for fixed pilot tone locations in various transmissions, such as in different bandwidths.

As data transmission rate demands increase with additional devices joining networks or additional data being added for transmission over networks, larger channel bandwidths may be introduced, for example for orthogonal frequency-division multiple access (OFDMA) transmissions. In one example, tone plans for a 320 MHz total channel bandwidth may be introduced to assist in increasing peak system transmission data rates and to more efficiently utilize available channels. For example, as new frequencies are available for use (for example, 6 GHz), these new tone plans for the larger total channel bandwidths may more efficiently utilize the newly available channels. Moreover, an increased total bandwidth which may be provided by these new tone plans may allow for better rate vs range tradeoff. In this case, the same or a similar transmission rate may be used to provide larger coverage if a larger total bandwidth is used. Additionally, the larger total channel bandwidths also may increase tone plan efficiency (for example, for a particular BW, how many tones could be used for data transmission) and also may increase a number of guard bands. As with any total channel bandwidth being used, different modes may be available depending on channel availability. For example, current 80 MHz channel bandwidths may be separated into 20 MHz, 40 MHz, or 80 MHz modes.

Figure 5:
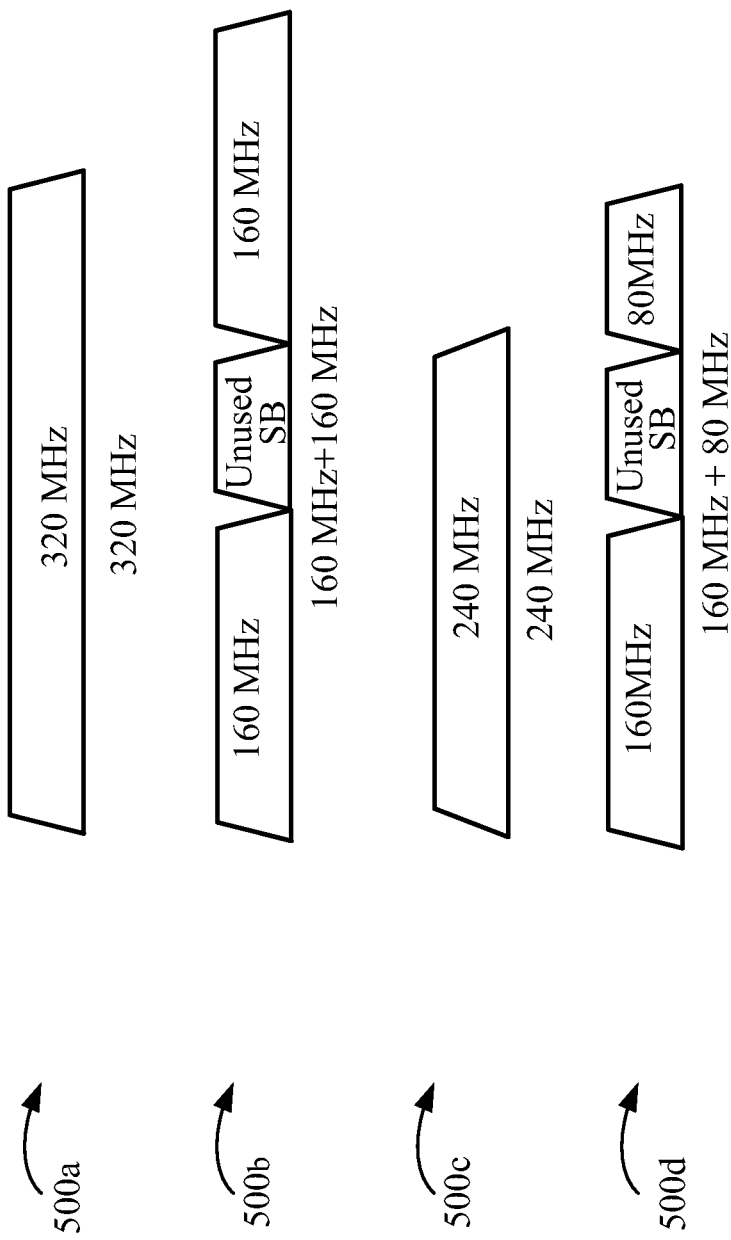
FIG. 5 shows example modes available for 320 MHz bandwidth transmissions and 240 MHz bandwidth transmissions.

FIG. 5 shows example modes 500a-500d available for 320 MHz bandwidth transmissions and 240 MHz bandwidth transmissions. These may be some of the bandwidth modes available in IEEE 802.11be. As shown in FIG. 5, the 320 MHz bandwidth transmissions may be transmitted in at least two different modes as shown in 500a and 500b. Each of the modes 500a and 500b may represent a different combination of channel bandwidth (BW) and frequency bands that may be used, depending on channel availability (for example, in 2.4, 5, or 6 GHz networks). In a first mode 500a, the 320 MHz transmission may be transmitted in a single, contiguous frequency band having 320 MHz bandwidth. In a second mode 500b, the 320 MHz transmission may be transmitted in two non-contiguous, disjoint frequency bands having 160 MHz bandwidth and 80 MHz bandwidth, respectively. As shown, each of the frequency bands is separated by unused sub-bands (SBs). In this context, unused SBs refer to portions of the frequency band that are not part of the wireless channel.

Similarly, the 240 MHz bandwidth transmissions may be transmitted in at least two different modes as shown in 500c and 500d. In a third mode 500c, the 240 MHz transmission may be transmitted in a single, contiguous frequency band having 240 MHz bandwidth. In a fourth mode 500d, the 240 MHz transmission may be transmitted in two non-contiguous, disjoint frequency bands having 160 MHz bandwidth and 80 MHz bandwidth, respectively. As shown, each of the frequency bands is separated by unused sub-bands (SBs). In this context, unused SBs refer to portions of the frequency band that are not part of the wireless channel.

In some implementations, tone plans may be designed and signal generation may be completed for contiguous frequency band of 80 MHz, 160 MHz, and 320 MHz bandwidth sizes.

Each of the modes 500a-500d may have one or more options for creating the 320 MHz bandwidth transmission or the 240 MHz bandwidth transmission. The first mode 500a may include (1) a first option of having a single 320 MHz tone plan; (2) a second option of duplicating two 160 MHz tone plans, one in each of two PHY 160 MHz subchannels and separated by an unused SB; and (3) a third option of duplicating four 80 MHz tone plans, one in each of four PHY 80 MHz subchannels separated by unused SBs. The second mode 500b may include (1) a first option of using two 160 MHz tone plans, each in one PHY 160 MHz subchannel and (2) a second option of duplicating four 80 MHz tone plans, one in each of four PHY 80 MHz subchannels and separated by unused SBs. The third mode 500c may include (1) a first option of having a single 240 MHz tone plan; (2) a second option of one 160 MHz tone plan in one PHY 160 MHz subchannel and one 80 MHz subchannel in one PHY 80 MHz subchannel and separated by an unused SB; and (3) a third option of duplicating three 80 MHz tone plans, one in each of three PHY 80 MHz subchannels separated by unused SBs.

Based on these modes and options, different tone plans may be designed or generated for the 80, 160, or 320 MHz bandwidths. Tone plan designs for 80 MHz, 160 MHz, and 320 MHz for 3 symbol duration options are the building blocks. In some implementations, the different frequency bands may use different symbol durations. For example, for the third option of the 320 MHz frequency band, the 160 MHz frequency band may use a first symbol duration while the 80 MHz frequency bands may use a second symbol duration different from the first symbol duration. In some implementations, the tone plans for the 320 MHz bandwidth may be generated or designed based on the building blocks (for example, the 80 and 160 MHz transmissions discussed herein).

The different modes described herein for the 320 MHz channel bandwidth and 240 MH channel bandwidth may provide different options of symbol durations and tone spacings, depending on the mode being used.

FIG. 6 illustrates examples of OFDMA resource unit (RU) allocations. In an OFDMA system 600, multiple client devices (stations) may communicate (transmit or receive) with an access point (AP) at the same time by sharing available bandwidth. OFDMA allows sub-carriers (also referred to as "tones") in a channel bandwidth to be grouped into smaller portions called "Resource Units" (RU). Each RU may consists of a group of tones. In various example implementations, an RU may consist of 26 tones, 52 tones, 106 tones, 242 tones, 484 tones, or 996 tones. That is, RUs may have different sizes depending on the number of tones or subcarriers in an RU, such that for example an RU26 contains 26 tones and an RU52 contains 52 tomes, and so on. These individual RU's are assigned to different client devices or stations, which allows the access point to serve them simultaneously during uplink and downlink transmissions. In the OFDMA allocation system 600, individual RUs may be allocated to each device communicating over the wireless network, the RUs need not be contiguous.

Although not illustrated in FIG. 6, some RUs may be scheduled to carry one or more physical channels, including control channels, shared channels, data channels, among other examples. Other RUs may also carry pilots or reference signals. These pilots or reference signals (for example, including long training fields or LTFs) may provide for a receiving device to perform channel estimation of the corresponding channel, which may enable coherent demodulation/detection of the control or data channels within the RU.

FIG. 7 illustrates examples of tone spacings and index ranges for various fast Fourier transform (FFT) sizes and symbol durations for 80 MHz, 160 MHz, and 320 MHz transmissions. Various 802.11 protocols may use 1x symbol durations. The 1x symbol durations may have a tone spacing of 312.5 kHz. Some 802.11 protocols may also use 4x symbol durations. The 4x symbol durations may have a tone spacing of 78.125 kHz. Next generation 802.11 devices and standards may utilize either the 1x or 4x symbol durations and may also utilize a 2x symbol duration of 6.4 µs having a tone spacing of 156.25 kHz. Specifically, FIG. 7 shows an FFT size for each option (for example, combination of symbol duration and tone spacing). For example, the 80 MHz channel bandwidth (BW) has 256 tones available at 1x symbol duration and 312.5 kHz spacing (option 1), 512 tones available at 2x symbol duration and 156.25 kHz spacing (option 2), and 1024 tones available at 4x symbol duration and 78.125 kHz spacing (option 3). The 160 MHz channel BW has 512 tones available at 1x symbol duration and 312.5 kHz spacing, 1024 tones available at 2x symbol duration and 156.25 kHz spacing, and 2048 tones available at 4x symbol duration and 78.125 kHz spacing. The 320 MHz channel BW has 1024 tones available at 1x symbol duration and 312.5 kHz spacing, 2048 tones available at 2x symbol duration and 156.25 kHz spacing, and 4096 tones available at 4x symbol duration and 78.125 kHz spacing. In some aspects, 1x and 2x symbol durations may have similar benefits as compared to a 4x symbol durations. In some aspects, 1x and 2x symbol durations may have lower complexity, latency, and memory requirements due to corresponding smaller Fast Fourier Transform (FFT) sizes as compared to the 4x symbol duration, which has a higher complexity, latency, and memory requirement due to its larger FFT size. The 1x and 2x symbol durations each have a lower tone plan and cyclic prefix (CP) or guard interval (GI) efficiency than the 4x symbol duration that has a higher tone plan and GI efficiency. Furthermore, the 1x and 2x symbol durations may not have outdoor support while the 4x symbol duration may have outdoor support, although the 320 MHz bandwidth may be generally used indoors. The 1x and 2x symbol durations may need a new design to provide OFDMA support, as they cannot be mixed with high efficiency STAs in DL/UL OFDMA. However, the 4x symbol duration may provide OFDMA support, as it can be mixed with HE STAs in DL/UL OFDMA. When memory size is not being considered, then the 4x symbol duration may be a more natural choice for symbol duration. However, if maintaining memory size is the goal, then the 1x or 2x symbol duration may be considered. For 1x trigger based PPDU, the UL overhead of 50% in view of the 1.6 µs GI is too high, so the 2x symbol duration may be more likely a selection. In some implementations, reduced symbol durations may advantageously result in reduced complexity and reduced memory utilization.

In one example, data symbols may have a 4x symbol duration, which is 12.8 µs+GI (guard interval). By contrast, LTF symbols may have various multiples of a symbol duration. A 1x LTF uses 1x symbol duration, which is 3.2 µs+GI. A 2x LTF uses 2x symbol duration, which is 6.4 µs+GI. A 4x LTF uses 4x symbol duration, which is 12.8 µs+GI, same as data symbols. In 802.11ax, defines three different GI values: 0.8 µs, 1.6 µs, and 3.2 µs. Each one of the three values may be selected based on the PPDU format and channel condition. The same GI may be applied to LTF field and data field. For packets using 1x LTF, either 0.8 µs or 1.6 µGIs can be used depending on the PPDU format. For packets using 2xLTF, either 0.8 µs or 1.6 µs GIs can be used depending on the PPDU format. For packets using 4xLTF, either 0.8 µs, or 3.2 µs GIs may be used depending on PPDU format or channel condition.

Accordingly, the index ranges of the tones for each of these options is shown in FIG. 7, which shows that 256 tones have a range of [428, 127], 512 tones have a range of [−256, 255], 1024 tones have a range of [−512, 511], 2048 tones have a range of [4024, 1023], and 4096 tones have a range from [−b 2048, 2047].

As the IEEE 802.11 standards evolve to use higher bandwidths (for example, 320 MHz in IEEE 802.11be), it has been recognized that OFDM transmissions can have high peak values in the time domain since many subcarrier components are added via an inverse fast Fourier transformation (IFFT) operation. Consequently, OFDM transmissions may have a high peak-to-average power ratio (PAPR) when compared to single-carrier transmissions. The high PAPR of OFDM and OFDMA transmissions decreases the signal-to-quantization noise ratio (SQNR) of the analog-digital convertor (ADC) and digital-analog convertor (DAC) in a radio chain while degrading the efficiency of the power amplifier in a transmitter.

A long training field (LTF) is used for wireless communications transmissions, including over a large bandwidth channel such as a 320 MHz bandwidth channel used for IEEE 802.11be. The LTF includes a training sequence that can be used by a receiving device to set or adjust an automatic gain control (AGC) function of the receiving device. AGC is a technique in an amplifier or chain of amplifiers used to adjust the signal amplitude at its output regardless of the variation of the signal amplitude at the input. The LTF may include a training sequence of predetermined signals that can be used to identify the beginning of the transmission and to set the AGC.

The LTF sequence may serve as a reference signal that enables a receiving device to perform channel estimation of the corresponding channel, which may enable coherent demodulation/detection of the control or data channels.

As 802.11be seeks extreme high throughput (EHT) wireless communications using large bandwidth channels and OFDM modulation, it would be advantageous to configure the LTF to minimize or reduce the peak-to-average-power ratio (PAPR) of the LTF so that the LTF does not skew the AGC incorrectly.

One solution is to reutilize a High Efficiency (HE)-LTF sequence defined by the IEEE 802.11 standards for 80 MHz bandwidth channels as a basis to construct a longer EHT-LTF sequence for 320 MHz bandwidth channels. In order to minimize the PAPR of the EHT-LTF for 320 MHz bandwidth channels, the HE-LTF for 80 MHz bandwidth channels may be modified by phase rotations and concatenations to achieve a minimized PAPR or a PAPR below a threshold level. One way to achieve this may be to conduct a simulation to search for a combination of phase rotation coefficients and HE-LTF segments that provide such minimized PAPR.

FIG. 8 illustrates an example of an Extreme High Throughput (EHT) long training field (LTF) (EHT-LTF) construction for a 320 MHz bandwidth channel, where each symbol of the EHT-LTF uses a 1x symbol duration and each symbol of a data field uses a 4x symbol duration. For example, each symbol of the EHT-LTF sequence may have a symbol duration of 3.2 μs plus a guard interval (GI) while each symbol of the data field may use 12.8 μs+GI (guard interval).

The EHT-LTF sequence for the 320 MHz bandwidth channel is based on a concatenation of four LTF subsequences, each covering an 80 MHz bandwidth channel. In this example, the four LTF subsequences are defined ($LTF_{80MHz\_lower1\_1x}$, $LTF_{80MHz\_upper1\_1x}$, $LTF_{80MHz\_lower2\_1x}$, $LTF_{80MHz\_lower2\_1x}$, $LTF_{80MHz\_upper2\_1x}$) with filler zeros (for example, 23 zeros) in between. Each of the LTF subsequences may be a function of different portions, segments, or subsequences of the HE-LTF sequence for an 80 MHz bandwidth channel that is selectively phase-rotated by a set of phase rotation values to minimize PAPR for the 320 MHz bandwidth channel or a 240 MHz bandwidth channel. FIG. 9 illustrates examples of High Efficiency (HE) LTF (HE-LTF) subsequences for an 80 MHz bandwidth channel including a first LTF base sequence and a second LTF base sequence. These HE-LTF subsequences are specified in the IEEE 802.11ax standard.

A first LTF subsequence ($LTF_{80MHz\_lower1\_1x}$) may be a combination of the first LTF base sequence LTF-A that is phase-rotated by a first rotation value s1, concatenated with the second LTF base sequence LTF-B that is phase-rotated by a second rotation value s2, and a zero in between both sequences.

A second LTF subsequence ($LTF_{80MHz\_upper1\_1x}$) may be a combination of the first LTF base sequence LTF-A that is phase-rotated by a third rotation value s3, concatenated with the second LTF base sequence LTF-B that is phase-rotated by a fourth rotation value s4, and a zero in between both sequences.

A third LTF subsequence ($LTF_{80MHz\_lower2\_1x}$) may be a combination of the first LTF base sequence LTF-A that is phase-rotated by a fifth rotation value s5, concatenated with the second LTF base sequence LTF-B that is phase-rotated by a sixth rotation value s6, and a zero in between both sequences.

A fourth LTF subsequence ($LTF_{80MHz\_upper2\_1x}$) may be a combination of the first LTF base sequence LTF-A that is phase-rotated by a seventh rotation value s7, concatenated with the second LTF base sequence LTF-B that is phase-rotated by an eighth rotation value s8, and a zero in between both sequences.

In one implementation, the phase rotation values s=[s1 s2 s3 s4 s5 s6 s7 s8] may be [1 1 1 1 −1 −1 −1 −1] to minimize or reduce PAPR for the EHT-LTF for a 320 MHz bandwidth channel or a 240 MHz bandwidth channel.

In some implementations, the phase rotation values or coefficients s=[s1 s2 s3 s4 s5 s6 s7 s8] may be scaled or multiplied by a common scaling factor b without affecting the optimization to minimize the PAPRs. Additionally, the various LTF subsequences may be concatenated in different orders without departing from the present disclosure. For instance, the EHT-LTF sequence may be the concatenation of: second LTF subsequence, k zeros, third LTF subsequence, k zeros, fourth LTF subsequence, k zeros, and first LTF subsequence. In another example, the EHT-LTF sequence may be the concatenation of: fourth LTF subsequence, k zeros, second LTF subsequence, k zeros, first LTF subsequence, k zeros, and third LTF subsequence. In summary, any combination or order of the LTF subsequences may be used to derive the EHT-LTF sequence.

FIG. 10 illustrates an example of an EHT-LTF construction for a 320 MHz bandwidth channel, where each symbol of the EHT-LTF uses a 2x symbol duration and each symbol of a data field uses a 4x symbol duration. For example, each symbol of the EHT-LTF sequence may have a symbol duration of 6.4 μs plus a guard interval (GI) while each symbol of the data field may use 12.8 μs+GI (guard interval).

The EHT-LTF sequence for the 320 MHz bandwidth channel is based on a concatenation of four LTF subsequences, each covering an 80 MHz bandwidth channel. In this example, the four LTF subsequences are defined ($LTF_{80MHz\_lower1\_2x}$, $LTF_{80MHz\_upper1\_2x}$, $LTF_{80MHz\_lower2\_2x}$, $LTF_{80MHz\_upper2\_2x}$) with filler zeros (for example, 23 zeros) in between. Each of the LTF subsequences may be a function of different portions, segments, subsequences of the HE-LTF sequence for an 80 MHz bandwidth channel that is selectively phase-rotated by a set of rotation values to minimize PAPR for the 320 MHz bandwidth channel or a 240 MHz bandwidth channel. FIG. 11 illustrates examples of HE-LTF subsequences for an 80 MHz bandwidth channel including a first LTF base sequence LTF-A, a second LTF base sequence LTF-B, a third LTF base sequence LTF-C, a fourth LTF base sequence LTF-D, and a fifth LTF base sequence LTF-E. These HE-LTF subsequences are specified in the IEEE 802.11ax standard.

A first LTF subsequence ($LTF_{80MHz\_lower1\_2x}$) may be a combination of the first LTF base sequence LTF-A that is phase-rotated by a first rotation value q1, concatenated with the second LTF base sequence LTF-B that is phase-rotated by a second rotation value q2, concatenated with the third LTF base sequence LTF-C that is phase-rotated by a third rotation value q3, concatenated with the fourth LTF base sequence LTF-D that is phase-rotated by a fourth rotation value q4, and concatenated with the fifth LTF base sequence LTF-E that is phase-rotated by a fifth rotation value q5.

A second LTF subsequence ($LTF_{80MHz\_upper1\_2x}$) may be a combination of the first LTF base sequence LTF-A that is phase-rotated by a six rotation value q6, concatenated with the second LTF base sequence LTF-B that is phase-rotated by a seventh rotation value q7, concatenated with the third LTF base sequence LTF-C that is phase-rotated by an eight rotation value q8, concatenated with the fourth LTF base sequence LTF-D that is phase-rotated by a ninth rotation value q9, and concatenated with the fifth LTF base sequence LTF-E that is phase-rotated by a tenth rotation value q10.

A third LTF subsequence ($LTF_{80MHz\_lower2\_2x}$) may be a combination of the first LTF base sequence LTF-A that is phase-rotated by an eleventh rotation value q11, concatenated with the second LTF base sequence LTF-B that is phase-rotated by a twelfth rotation value q12, concatenated with the third LTF base sequence LTF-C that is phase-rotated by a thirteenth rotation value q13, concatenated with the fourth LTF base sequence LTF-D that is phase-rotated by a fourteenth rotation value q14, and concatenated with the fifth LTF base sequence LTF-E that is phase-rotated by a fifteenth rotation value q15.

A fourth LTF subsequence ($LTF_{80MHz\_upper2\_2x}$) may be a combination of the first LTF base sequence LTF-A that is phase-rotated by a sixteenth rotation value q16, concatenated with the second LTF base sequence LTF-B that is phase-rotated by a seventeenth rotation value q17, concatenated with the third LTF base sequence LTF-C that is phase-rotated by an eighteenth rotation value q18, concatenated with the fourth LTF base sequence LTF-D that is phase-rotated by a nineteenth rotation value q19, and concatenated with the fifth LTF base sequence LTF-E that is phase-rotated by a twentieth rotation value q20.

In one implementation, the phase rotation values q=[q1 q2 q3 q4 q5 q6 q7 q8 q9 q10 q11 q12 q13 q14 q15 q16 q17 q18 q19 q20] may be [+1 −1 −1 −1 +1 −1 +1 +1 +1 −1 −1 +1 +1 +1 −1 −1 +1 −1 −1 +1] or [+1 +1 −1 −1 −1 −1 −1 −1 −1 −1 −1 +1 +1 +1 +1 +1 +1 +1 +1 +1] to minimize PAPR for the EHT-LTF for a 320 MHz bandwidth channel or a 240 MHz bandwidth channel.

In some implementations, the phase rotation values or coefficients q=[q1 q2 q3 q4 q5 q6 q7 q8 q9 q10 q11 q12 q13 q14 q15 q16 q17 q18 q19 q20] may be scaled or multiplied by a common scaling factor b without affecting the optimization to minimize the PAPRs. Additionally, the various LTF subsequences may be concatenated in different orders without departing from the present disclosure. For instance, the EHT-LTF sequence may be the concatenation of: second LTF subsequence, k zeros, fourth LTF subsequence, k zeros, third LTF subsequence, k zeros, and first LTF subsequence. In another example, the EHT-LTF sequence may be the concatenation of: fourth LTF subsequence, k zeros, first LTF subsequence, k zeros, third LTF subsequence, k zeros, and second LTF subsequence. In summary, any combination or order of the LTF subsequences may be used to derive the EHT-LTF sequence.

FIG. 12 illustrates another example of an EHT-LTF construction for a 320 MHz bandwidth channel, where each symbol of the EHT-LTF uses a 2x symbol duration and each symbol of a data field uses a 4x symbol duration. For example, each symbol of the EHT-LTF sequence may have a symbol duration of 6.4 µs plus a guard interval (GI) while each symbol of the data field may use 12.8 µs+GI (guard interval).

The EHT-LTF sequence for the 320 MHz bandwidth channel is based on a concatenation of four LTF subsequences, each covering an 80 MHz bandwidth channel. In this example, the four LTF subsequences are defined ($LTF_{80MHz\_lower1\_2x}$, $LTF_{80MHz\_upper1\_2x}$, $LTF_{80MHz\_lower2\_2x}$, $LTF_{80MHz\_upper2\_2x}$) with filler zeros (for example, 23 zeros) in between. Each of the LTF subsequences may be a function of different portions, segments, subsequences of the HE-LTF sequence for an 80 MHz bandwidth channel that is selectively phase-rotated by a set of rotation values to minimize PAPR for the 320 MHz bandwidth channel or a 240 MHz bandwidth channel. FIG. 13 illustrates examples of HE-LTF subsequences for an 80 MHz bandwidth channel including a first LTF base sequence LTF-A and a second LTF base sequence LTF-B.

In one example, the HE-LTF subsequences (the first LTF base sequence LTF-A and the second LTF base sequence LTF-B) may be based on an 80 MHz LTF segment formed from two High Efficiency (HE) LTF (HE-LTF) sequences for subchannels having a 40 MHz channel bandwidth. The 40 MHz channel bandwidth sequences are modified to add optimized values for missing tones used in the 80 MHz channel bandwidth. Once the 80 MHz LTF segment is obtained, it may be split to obtain the first LTF base sequence LTF-A and the second LTF base sequence LTF-B.

For instance, the subsequences for the 80 MHz bandwidth channel may be formed by interleaving and phase rotating values of four base sub-segments Sa, Sb, Sc, and Sd, where
Sa=[+1 +1 +1 +1 +1 −1 −1 +1 +1 −1 +1 −1 +1],
Sb=[Sa(1:7), −Sa(8:13)],
Sc=[−Sa(1:6), Sa(7:13)], and
Sd=[Sd(1:14)], where the values Sd(x) are configured to reduce a peak-to-average power ratio in an 80 MHz segment. In one example, Sd=[−1, −1, −1, −1, 1, −1, −1, −1, 1, 1, 1, −1, −1, −1]. The sub-sequences Sa, Sb, and Sc may be defined for HE-LTF, and the sub-sequence Sd may be optimized to add tones and reduce PAPR.

As illustrated in FIG. 12, a first LTF subsequence ($LTF_{80MHz\_lower1\_2x}$) may be a combination of the first LTF base sequence LTF-A that is phase-rotated by a first rotation value q1, concatenated with the second LTF base sequence LTF-B that is phase-rotated by a second rotation value q2.

A second LTF subsequence ($LTF_{80MHz\_upper1\_2x}$) may be a combination of the first LTF base sequence LTF-A that is phase-rotated by a third rotation value q3, concatenated with the second LTF base sequence LTF-B that is phase-rotated by a fourth rotation value q4.

A third LTF subsequence ($LTF_{80MHz\_lower2\_2x}$) may be a combination of the first LTF base sequence LTF-A that is phase-rotated by a fifth rotation value q5, concatenated with the second LTF base sequence LTF-B that is phase-rotated by a sixth rotation value q6.

A fourth LTF subsequence ($LTF_{80MHz\_upper2\_2x}$) may be a combination of the first LTF base sequence LTF-A that is phase-rotated by a seventh rotation value q7, concatenated with the second LTF base sequence LTF-B that is phase-rotated by an eighth rotation value q8.

In one implementation, the phase rotation values q=[q1 q2 q3 q4 q5 q6 q7 q8] may be [1 1 1 1 −1 −1 −1 1] to minimize PAPR for the EHT-LTF for a 320 MHz bandwidth channel or a 240 MHz bandwidth channel.

In some implementations, the phase rotation values or coefficients q=[q1 q2 q3 q4 q5 q6 q7 q8] may be scaled or multiplied by a common scaling factor b without affecting the optimization to minimize the PAPRs. Additionally, the various LTF subsequences may be concatenated in different orders without departing from the present disclosure. For instance, the EHT-LTF sequence may be the concatenation of: first LTF subsequence, k zeros, fourth LTF subsequence, k zeros, third LTF subsequence, k zeros, and second LTF subsequence. In another example, the EHT-LTF sequence may be the concatenation of: second LTF subsequence, k zeros, fourth LTF subsequence, k zeros, third LTF subsequence, k zeros, and first LTF subsequence. In summary, any combination or order of the LTF subsequences may be used to derive the EHT-LTF sequence.

FIG. 14 illustrates a first example of an EHT long training field (LTF) construction for a 320 MHz bandwidth channel, where each symbol of the EHT-LTF uses a 4x symbol duration and each symbol of a data field uses a 4x symbol duration. For example, each symbol of the EHT-LTF sequence may have a symbol duration of 12.8 µs plus a guard interval (GI) while each symbol of the data field may use 12.8 µs plus GI (guard interval).

The EHT-LTF sequence for the 320 MHz bandwidth channel is based on a concatenation of four subsequences, each covering an 80 MHz bandwidth channel. In this example, the four LTF subsequences are defined ($LTF_{80MHz\_lower1\_4x}$, $LTF_{80MHz\_upper1\_4x}$, $LTF_{80MHz\_lower2\_4x}$, $LTF_{80MHz\_upper2\_4x}$) with filler zeros (for example, 23 zeros) in between. Each of the LTF subsequences may be a function of different portions, segments, or subsequences of the HE-LTF sequence for an 80 MHz bandwidth channel that is selectively phase-rotated by a set of phase rotation values to minimize PAPR for the 320 MHz bandwidth channel or a 240 MHz bandwidth channel. FIG. 15 illustrates examples of HE-LTF subsequences for an 80 MHz bandwidth channel including a first LTF base sequence LTF-A, a second LTF base sequence LTF-B, a third LTF base sequence LTF-C, and a fourth LTF base sequence LTF-D.

A first LTF subsequence ($LTF_{80MHz\_lower1\_4x}$) may be a combination of a first LTF base sequence LTF-A that is phase-rotated by a first rotation value n1, concatenated with a second LTF base sequence LTF-B that is phase-rotated by a second rotation value n2, followed by a zero, concatenated with the third LTF base sequence LTF-C that is phase-rotated by a third rotation value n3, concatenated with the fourth LTF base sequence LTF-D that is phase-rotated by a fourth rotation value n4.

A second LTF subsequence ($LTF_{80MHz\_upper1\_4x}$) may be a combination of the first LTF base sequence LTF-A that is phase-rotated by a fifth rotation value n5, concatenated with the second LTF base sequence LTF-B that is phase-rotated by a sixth rotation value n6, followed by a zero, concatenated with the third LTF base sequence LTF-C that is phase-rotated by a seventh rotation value n7, concatenated with the fourth LTF base sequence LTF-D that is phase-rotated by an eighth rotation value n8.

A third LTF subsequence ($LTF_{80MHz\_lower2\_4x}$) may be a combination of the first LTF base sequence LTF-A that is phase-rotated by a ninth rotation value n9, concatenated with the second LTF base sequence LTF-B that is phase-rotated by a tenth rotation value n10, followed by a zero, concatenated with the third LTF base sequence LTF-C that is phase-rotated by an eleventh rotation value n11, concatenated with the fourth LTF base sequence LTF-D that is phase-rotated by a twelfth rotation value n12.

A fourth LTF subsequence ($LTF_{80MHz\_upper2\_4x}$) may be a combination of the first LTF base sequence LTF-A that is phase-rotated by a thirteenth rotation value n13, concatenated with the second LTF base sequence LTF-B that is phase-rotated by a fourteenth rotation value n14, followed by a zero, concatenated with the third LTF base sequence LTF-C that is phase-rotated by a fifteenth rotation value n15, concatenated with the fourth LTF base sequence LTF-D that is phase-rotated by a sixteenth rotation value n16.

In one implementation, the phase rotation values n=[n1 n2 n3 n4 n5 n6 n7 n8 n9 n10 n11 n12 n13 n14 n15 n16] may be [1 −1 1 −1 1 −1 −1 1 1 1 −1 −1 1 1 1 1] or [1 −1 −1 1 1 −1 1 −1 1 1 1 1 1 −1 −1 −1] to minimize PAPR for the EHT-LTF for a 320 MHz bandwidth channel or a 240 MHz bandwidth channel.

In some implementations, the phase rotation values or coefficients n=[n1 n2 n3 n4 n5 n6 n7 n8 n9 n10 n11 n12 n13 n14 n15 n16] may be scaled or multiplied by a common scaling factor b without affecting the optimization to minimize the PAPRs. Additionally, the various LTF subsequences may be concatenated in different orders without departing from the present disclosure. For instance, the EHT-LTF sequence may be the concatenation of: third LTF subsequence, k zeros, second LTF subsequence, k zeros, third LTF subsequence, k zeros, and first LTF subsequence. In another example, the EHT-LTF sequence may be the concatenation of: fourth LTF subsequence, k zeros, first LTF subsequence, k zeros, third LTF subsequence, k zeros, and second LTF subsequence. In summary, any combination or order of the LTF subsequences may be used to derive the EHT-LTF sequence.

FIG. 16 illustrates a second example of an EHT long training field (LTF) construction for a 320 MHz bandwidth channel, where each symbol of the EHT-LTF uses a 4x symbol duration and each symbol of a data field uses a 4x symbol duration. For example, each symbol of the EHT-LTF sequence may have a symbol duration of 12.8 µs plus a guard interval (GI) while each symbol of the data field may use 12.8 µs plus GI (guard interval).

The EHT-LTF sequence for the 320 MHz bandwidth channel is based on a concatenation of four LTF subsequences, each covering an 80 MHz bandwidth channel. In this example, the four LTF subsequences are defined ($LTF_{80MHz\_lower1\_4x}$, $LTF_{80MHz\_upper1\_4x}$, $LTF_{80MHz\_lower2\_4x}$, $LTF_{80MHz\_upper2\_4x}$) with filler zeros (for example, 23 zeros) in between. Each of the LTF subsequences may be a function of different portions, segments, or subsequences of the HE-LTF sequence for an 80 MHz bandwidth channel that is selectively phase-rotated by a set of phase rotation values to minimize PAPR for the 320 MHz bandwidth channel or a 240 MHz bandwidth channel. FIG. 17 illustrates examples of HE-LTF subsequences for an 80 MHz bandwidth channel including a first LTF base sequence and a second LTF base sequence.

A first LTF subsequence ($LTF_{80MHz\_lower1\_4x}$) may be a combination of the first LTF base sequence LTF-A that is phase-rotated by a first rotation value n1, concatenated with the second LTF base sequence LTF-B that is phase-rotated by a second rotation value n2, and a zero in between both sequences.

A second LTF subsequence ($LTF_{80MHz\_upper1\_4x}$) may be a combination of the first LTF base sequence LTF-A that is phase-rotated by a third rotation value n3, concatenated with the second LTF base sequence LTF-B that is phase-rotated by a fourth rotation value n4, and a zero in between both sequences.

A third LTF subsequence ($LTF_{80MHz\_lower2\_4x}$) may be a combination of the first LTF base sequence LTF-A that is phase-rotated by a fifth rotation value n5, concatenated with the second LTF base sequence LTF-B that is phase-rotated by a sixth rotation value n6, and a zero in between both sequences.

A fourth LTF subsequence ($LTF_{80MHz\_upper2\_4x}$) may be a combination of the first LTF base sequence LTF-A that is phase-rotated by a seventh rotation value n7, concatenated with the second LTF base sequence LTF-B that is phase-rotated by an eighth rotation value n8, and a zero in between both sequences.

In one implementation, the phase rotation values n=[n1 n2 n3 n4 n5 n6 n7 n8] may be [1 −1 −1 −1 −1 1 1 1] to minimize PAPR for the EHT-LTF for a 320 MHz bandwidth channel or a 240 MHz bandwidth channel.

In some implementations, the phase rotation values or coefficients n=[n1 n2 n3 n4 n5 n6 n7 n8] may be scaled or multiplied by a common scaling factor b without affecting the optimization to minimize the PAPRs. Additionally, the various LTF subsequences may be concatenated in different orders without departing from the present disclosure. For instance, the EHT-LTF sequence may be the concatenation of: second LTF subsequence, k zeros, first LTF subsequence, k zeros, fourth LTF subsequence, k zeros, and third LTF subsequence. In another example, the EHT-LTF sequence may be the concatenation of: fourth LTF subsequence, k zeros, second LTF subsequence, k zeros, first LTF subsequence, k zeros, and third LTF subsequence. In summary, any combination or order of the LTF subsequences may be used to derive the EHT-LTF sequence.

Another aspect provides for the EHT-LTF sequence to be optimized based on multi-stream PAPR performances for different resource units (RU) or multi-RUs (MRUs) (that is combining more than one RU to form a new unit), and depending on the RU size, different PAPR thresholds may be used for optimization. That is, the LTF sequence may be modified to achieve minimized PAPRs or PAPRs below threshold levels based on different (M)RUs.

In order to derive optimized phase rotation coefficients s, q, or n for the EHT-LTF sequences of FIG. 8, 10, 12, 14, or 16, an exhaustive search may be conducted for these optimized coefficients: s, q, or n, based on the PAPR results for the evaluated RUs or multi-RUs (MRUs). For instance, in the example of a 320 MHz bandwidth channel, RUs and MRU of size: 242, 484, 242+484, 996, 484+996 in a continuous 160 MHz, 2×996, 3×996, 3×996+484, 4×996 may be selected for optimization. For each RU or MRU, the multi-stream PAPR may be evaluated when single stream pilot (SSP) is used. For each sequence, the set of coefficients s, q, or n is selected that minimize the PAPR of all above-listed (M)RUs.

In selecting a set of phase rotation coefficients s, q, or n, it should be observed that for a single stream pilot (SSP), any P value unequal to R value changes the base EHT-LTF sequence. The P matrix and R matrix are rotation matrices applied to data subcarriers and pilot subcarriers when generating a multi-stream symbol, respectively. Thus, different P and R values lead to different PAPRs. EHT-LTF sequence optimization may be done by finding a sequence that minimize the maximal PAPR over all possible P and R values, that is:

$$EHT - LTF = \min_x \left\{ \max_{P,R} [PAPR(x, P, R)] \right\}$$

where x are sequences for all possible extra tone values and rotations on the base sequence.

Note that PAPR only depends on product of P and R values $\{P,R\} = \{e^{j\varphi}, 1\}$ and $\{-e^{j\varphi}, -1\}$ gives the same sequence rotated by 180 degrees All possible values for P*R for up to 8ss: [1 −1 exp(−j*pi/3) exp(−j*2*pi/3) exp(−j*4*pi/3) exp(−j*5*pi/3)].

In one implementation, a punctured version of this EHT-LTF sequence (obtained from FIGS. 8, 10, 12, 14, and 16) may also be used may be used for 240 MHz transmission. In one aspect, the EHT-LTF sequence may be optimized for 240 MHz bandwidth channel using additional MRUs: 2×996, 2×996+484.

Figure 18:
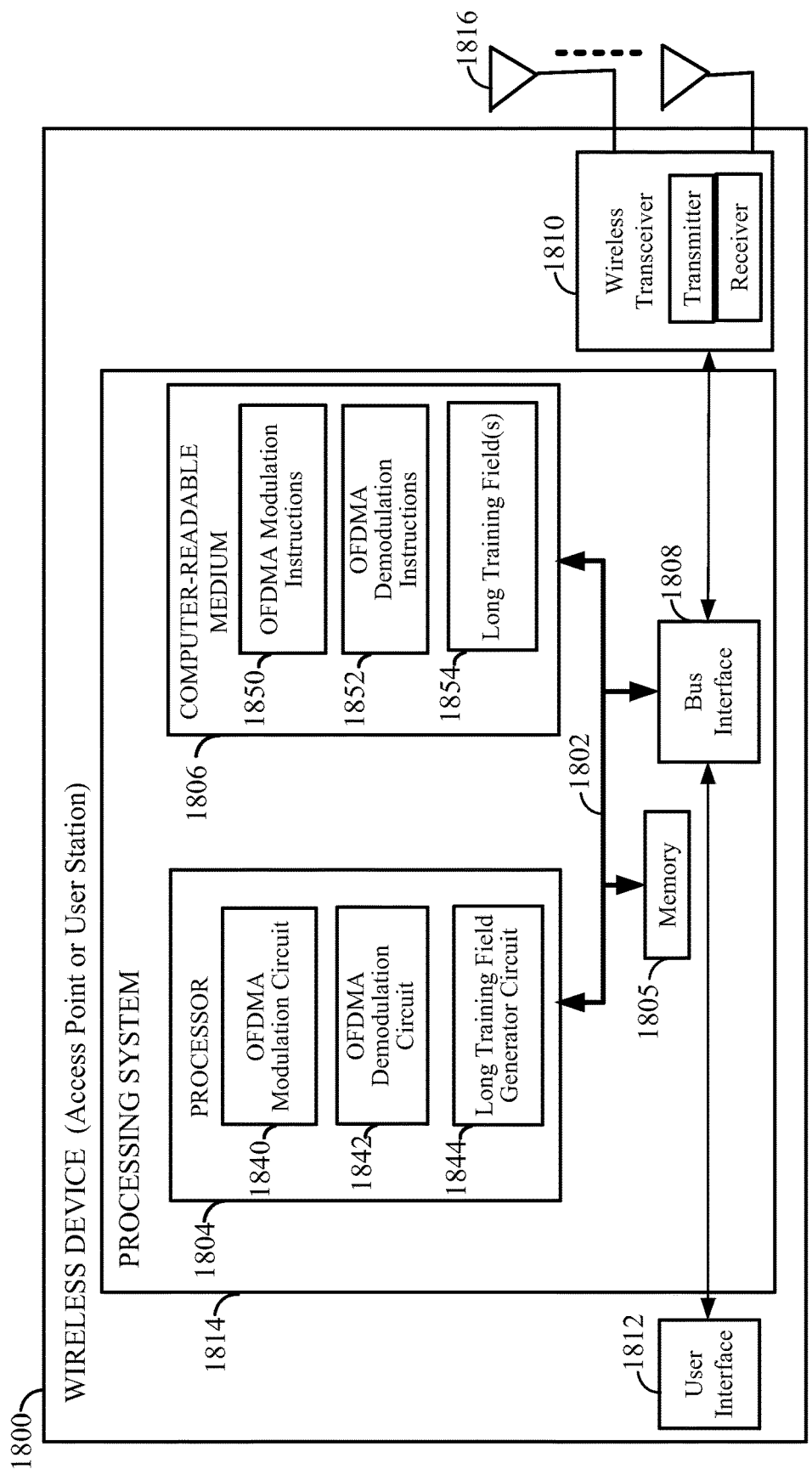
FIG. 18 is a block diagram illustrating an example of a wireless communication device that supports training fields for communications over large bandwidth channels that may achieve reduced peak-to-average power ratios.

FIG. 18 is a block diagram illustrating an example of a wireless communication device that supports training fields for communications over large bandwidth channels that may achieve reduced peak-to-average power ratios. The wireless communication device 1800 may be, for example, an access point or a user station, and may be implemented with a processing system 1814 that includes one or more processors 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1800 may be configured to perform any one or more of the functions described herein. That is, the processor 1804, as utilized in the wireless communication device 1800, may be used to implement any one or more of the processes and procedures further illustrated in the flow diagrams of FIGS. 19 and 20, to be discussed later.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, will not be described any further. A bus interface 1808 provides an interface between the bus 1802 and a wireless transceiver 1810 (comprising a transmitter and a receiver). The wireless transceiver 1810 provides a communication interface or means for communicating with various other apparatus over a transmission medium. For instance, the wireless transceiver 1810 may transmit and receive to and from one or more wireless communication device using one or more antennas 1816 and in accordance with an IEEE 802.11 protocol, such as IEEE 802.11be. In one implantation, the wireless transceiver 1814 may operate according to a multiple input multiple output (MIMO) mode.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software.

In one or more examples, the processor 1804 may include an OFDMA modulation circuit 1840, an OFDMA demodulation circuit 1842, and a Long Training Field Generator circuit 1844. In one example, the Long Training Field Generator circuit 1844 may serve to obtain an EHT-LTF sequence for a 320 MHz bandwidth channel. The OFDMA modulation circuit 1840 may serve to modulate the EHT-LTF sequence and a data field into an OFDM signal for transmission. The OFDMA demodulation circuit 1842 may serve to demodulate a received OFDM signal.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, among other examples, whether referred to as software, firmware, middleware, microcode, hardware description language, or otherwise. The software may reside on a computer-readable medium 1806. The computer-readable medium 1806 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1806 may include OFDMA modulation instructions 1850, OFDMA demodulation instructions 1852, or Long Training Fields instructions 1854. Of course, in the above examples, the circuitry included in the processor 1804 is merely provided as an example, and other means for carrying out the described functions may be included within various aspects of the present disclosure, including but not limited to the instructions stored in the computer-readable storage medium 1806, or any other suitable apparatus or means described in any one of the processes or algorithms described herein.

Figure 19:
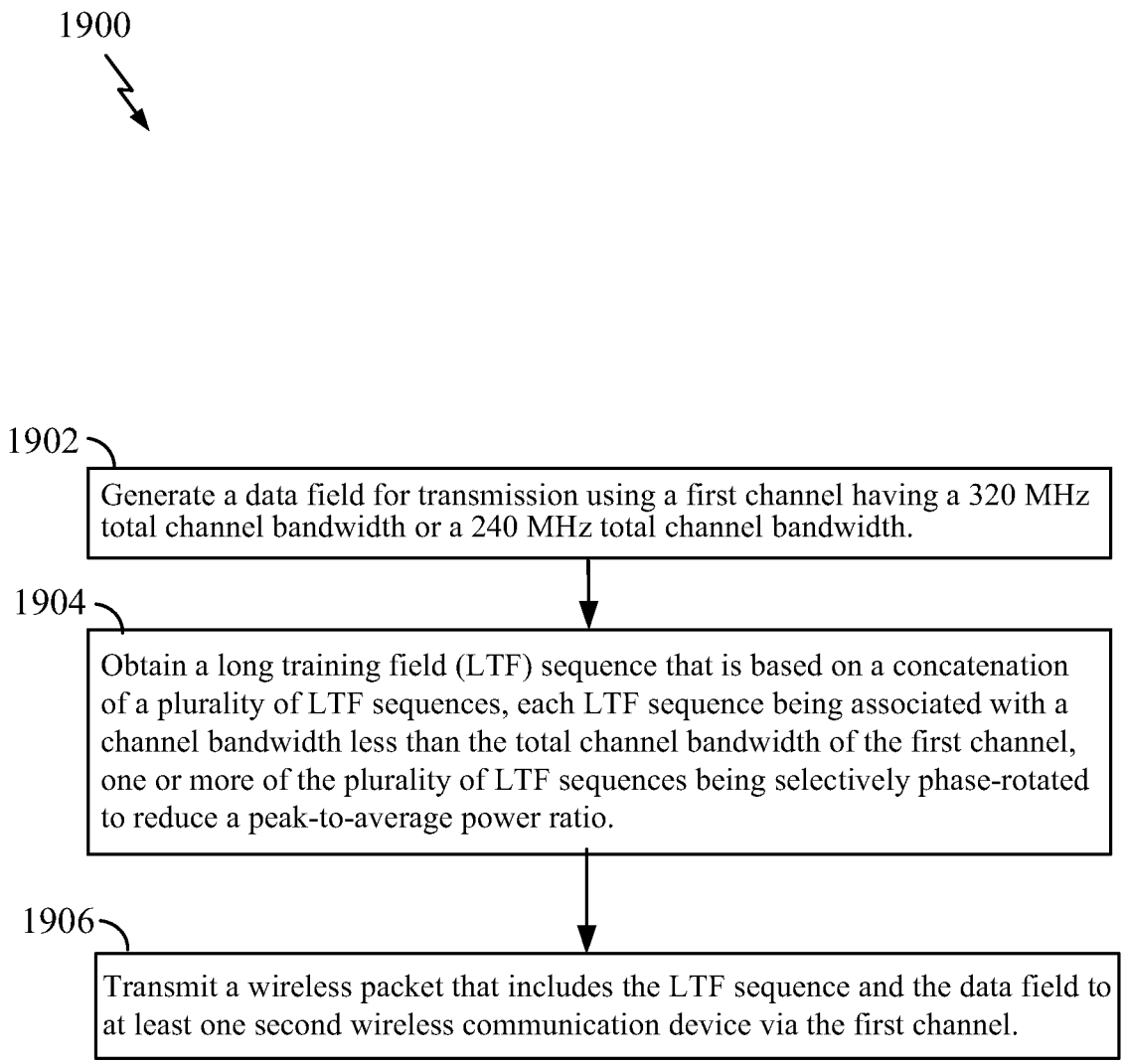
FIG. 19 is a flow chart illustrating an example method operational at a wireless communication device that supports training fields for communications over large bandwidth channels that may achieve reduced peak-to-average power ratios.

FIG. 19 is a flow chart illustrating an example method 1900 operational at a wireless communication device that supports training fields for communications over large bandwidth channels that may achieve reduced peak-to-average power ratios. At block 1902, a data field is generated for transmission using a first channel having a 320 MHz total channel bandwidth or a 240 MHz total channel bandwidth.

At block 1904, a long training field (LTF) sequence may be obtained (or retrieved, or generated) based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio.

In some implementations, the entire LTF sequence may be stored (in a storage device or memory device) at the wireless communication device in advance, such as during manufacturing or configuration. Then, the transmitting wireless communication device simply retrieves the entire LTF sequence from the memory device or storage device prior to transmission. That is, the LTF sequence need not be dynamically generated every time it is to be used.

In other implementations, the LTF sequence may be partially or fully generated or constructed at the transmitting wireless communication device, either dynamically or periodically. For example, the plurality of LTF subsequences may be stored (in a storage device or memory device) at the wireless communication device and the wireless communication device may generate the LTF sequence dynamically by applying a set of rotation coefficients or values (which are either stored at the wireless communication device or received) to the plurality of LTF subsequences, and then concatenating the phase-rotated LTF subsequences. In still other implementations, pre-phase-rotated LTF subsequences may be stored in the wireless communication device, which may then be dynamically or periodically concatenated at the wireless communication device prior to transmission of the LTF sequence. In yet other implementations, a plurality of base sequences are stored at the wireless communication device. In such implementations, the wireless communication device may dynamically retrieve the base sequences from memory, construct the LTF subsequences, phase-rotate the LTF subsequences, and concatenate the LTF subsequences to construct the LTF sequence.

In one example, each of the plurality of LTF subsequences is based on High Efficiency (HE) LTF (HE-LTF) sequence for a subchannel having an 80 MHz channel bandwidth. For example, the LTF sequence may be one of the EHT-LTF sequences generated according to FIGS. 8, 10, 12, and 14.

At block 1906, a wireless packet may be transmitted that includes the LTF and the data field to at least one second wireless communication device via the first channel.

In one implementation, a symbol duration of each symbol corresponding to the LTF sequence is one-fourth as long as a symbol duration of each symbol of the data field, and where the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences. For instance, the symbol duration of each symbol of the LTF sequence may be 3.2 μs plus a guard interval (GI) and the symbol duration of each symbol of the data field may be 12.8 μs plus the guard interval. In some implementation, the GI may be 0.8 μs, or 1.6 μs. In this example, the LTF sequence may be generated in accordance with FIGS. 8 and 9 where the phase rotation values s are selected to reduce or minimize a PAPR for the LTF transmission.

In another implementation, a symbol duration of each symbol corresponding to the LTF sequence is half as long as a symbol duration of each symbol of the data field, and the concatenation is a sequence formed by concatenating, in any order, a first LTF subsequence of the plurality of subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences. For instance, the symbol duration of each symbol of the LTF sequence may be 6.4 μs plus a guard interval (GI) and the symbol duration of each symbol of the data field may be 12.8 μs plus the guard interval. In some implementation, the GI may be 0.8 μs, or 1.6 μs. In this example, the LTF sequence may be generated in accordance with FIGS. 10 and 11 where the phase rotation values q are selected to reduce or minimize a PAPR for the LTF transmission.

In yet another implementation, a symbol duration of each symbol corresponding to the LTF sequence is the same as a symbol duration of each symbol of the data field, and where the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences. For instance, the symbol duration of each symbol of the LTF sequence may be 12.8 μs plus a guard interval (GI) and the symbol duration of each symbol of the data field may be 12.8 μs plus the guard interval. In some implementation, the GI may be 0.8 μs, or 3.2 μs. In this example, the LTF sequence may be generated in accordance with FIGS. 12 and 13 or FIGS. 14 and 15 where the phase rotation values n are selected to reduce or minimize a PAPR for the LTF transmission.

Figure 20:
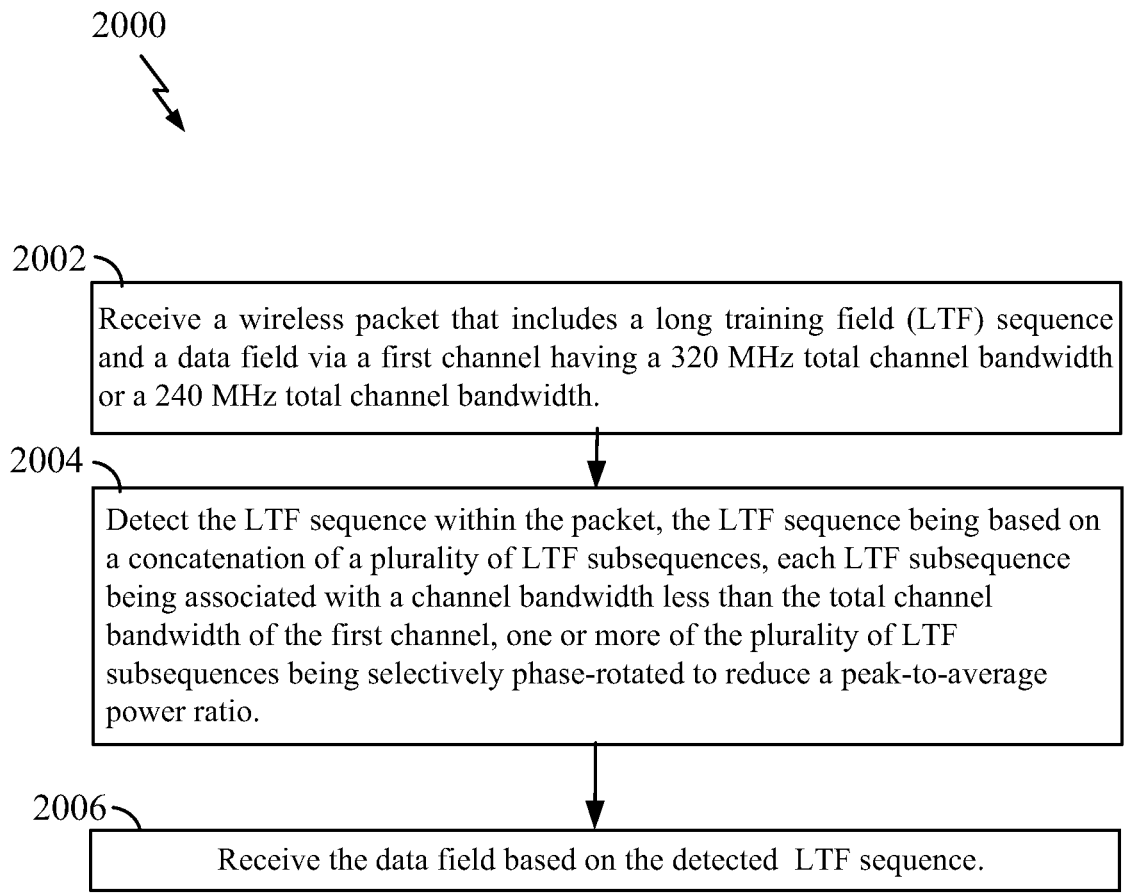
FIG. 20 is a flow chart illustrating an example method operational at a wireless communication device that supports training fields for communications over large bandwidth channels that may achieve reduced peak-to-average power ratios.

FIG. 20 is a flow chart illustrating an example method 2000 operational at a wireless communication device that supports training fields for communications over large bandwidth channels that may achieve reduced peak-to-average power ratios. The method illustrated in FIG. 20 may receive the LTF sequence(s) illustrated in FIGS. 8-17 as part of a transmission.

At block 2002 a wireless packet is received that includes a long training field (LTF) sequence and a data field via a first channel having a 320 MHz total channel bandwidth or a 240 MHz total channel bandwidth.

At block 2004, the LTF sequence is detected within the packet, the LTF sequence based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio.

At block 2006, the data field is received based on the detected LTF sequence.

The following provides an overview of aspects of the present disclosure:

Aspect 1: A method for wireless communication by a wireless communication device, comprising generating a data field for transmission using a first channel having a 320 MHz total channel bandwidth or a 240 MHz total channel bandwidth; obtaining a long training field (LTF) sequence based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio; and transmitting a wireless packet that includes the LTF sequence and the data field to at least one second wireless communication device via the first channel.

Aspect 2: The method of aspect 1, wherein each of the plurality of LTF subsequences is based on a High Efficiency (HE) LTF (HE-LTF) sequence for a subchannel having an 80 MHz channel bandwidth.

Aspect 3: The method of aspect 1 or 2, wherein a symbol duration of each symbol of the LTF sequence is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences.

Aspect 4: The method of any one of aspects 1, 2, or 3, wherein the symbol duration of each symbol of the LTF sequence is 3.2 μs plus a guard interval and the symbol duration of each symbol of the data field is 12.8 μs plus the guard interval.

Aspect 5: The method of any one of aspects 1, 2, 3 or 4, wherein the selectively phase-rotated one or more of the plurality of LTF subsequences are based on a set of phase rotation values s=[s1 s2 s3 s4 s5 s6 s7 s8] to the plurality of LTF subsequences, each of the LTF subsequences being based on a first LTF base sequence LTF-A and a second LTF base sequence LTF-B.

Aspect 6: The method of any one of aspects 3, 4, or 5, wherein the first LTF subsequence={s1*LTF-A, 0, s2*LTF-B}; the second LTF subsequence={s3*LTF-A, 0, s4*LTF-B}; the third LTF subsequence={s5*LTF-A, 0, s6*LTF-B}; and the fourth LTF subsequence={s7*LTF-A, 0, s8*LTF-B}.

Aspect 7: The method of any one of aspects 5 or 6, wherein the set of phase rotation values s=[s1 s2 s3 s4 s5 s6 s7 s8]=[1 1 1 1 −1 −1 −1 −1].

Aspect 8: The method of any one of aspects 3, 4, 5, or 6, wherein the first LTF base sequence LTF-A is: {−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0}; and the second LTF base sequence LTF-B is: {0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1}.

Aspect 9: The method of aspect 1 or 2, wherein a symbol duration of each symbol of the LTF sequence is the same as a symbol duration of each symbol of the data field, and the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LFT subsequences.

Aspect 10: The method of aspect 1, 2, or 9, wherein the selectively phase-rotated one or more of the plurality of LTF subsequences are based on a set of phase rotation values n=[n1 n2 n3 n4 n5 n6 n7 n8] to the plurality of LTF subsequences, each of the LTF subsequences being based on a first LTF base sequence LTF-A and a second LTF base sequence LTF-B, and the first LTF subsequence={n1*LTF-A, 0, n2*LTF-B}; the second LTF subsequence={n3*LTF-A, 0, n4*LTF-B}; the third LTF subsequence={n5*LTF-A, 0, n6*LTF-B}; and the fourth LTF subsequence={n7*LTF-A, 0, n8*LTF-B}.

Aspect 11: A wireless communication device, comprising: at least one processor; and at least one memory communicatively coupled with the at least one processor and storing processor-readable code that, when executed by the at least one processor, is configured to: generate a data field for transmission using a first channel having a 320 MHz total channel bandwidth or a 240 MHz total channel bandwidth; obtaining a long training field (LTF) sequence based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio; and transmit a wireless packet that includes the LTF sequence and the data field to at least one second wireless communication device via the first channel.

Aspect 12: The wireless communication device of aspect 11, wherein a symbol duration of each symbol of the LTF sequence is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences.

Aspect 13: The wireless communication device of any one of aspects 11 or 12, wherein the selectively phase-rotated one or more of the plurality of LTF subsequences are based on a set of phase rotation values s=[s1 s2 s3 s4 s5 s6 s7 s8] to the plurality of LTF subsequences, each of the LTF subsequences being based on a first LTF base sequence LTF-A and a second LTF base sequence LTF-B, and the first LTF subsequence ={s1*LTF-A, 0, s2*LTF-B}; the second LTF subsequence={s3*LTF-A, 0, s4*LTF-B}; the third LTF subsequence={s5*LTF-A, 0, s6*LTF-B}; and the fourth LTF subsequence={s7*LTF-A, 0, s8*LTF-B}.

Aspect 14: The wireless communication device of aspect 13, wherein the set of phase rotation values s=[s1 s2 s3 s4 s5 s6 s7 s8]=[1 1 1 1 −1 −1 −1 −1].

Aspect 15: The wireless communication device of any one of aspects 12, 13, or 14, wherein the first LTF base sequence LTF-A is: {−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, −1, 0, 0, 0}; and the second LTF base sequence LTF-B is: {0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, +1, 0, 0, 0, −1, 0, 0, 0, −1, 0, 0, 0, +1, 0, 0, +1}.

Aspect 16: A method for wireless communications by a wireless communication device, comprising: receiving a wireless packet that includes a long training field (LTF) sequence and a data field via a first channel having a 320 MHz total channel bandwidth or a 240 MHz total channel bandwidth; detecting the LTF sequence within the packet, the LTF sequence being based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio; and receiving the data field based on the detected LTF sequence.

Aspect 17: The method of aspect 16, wherein each of the plurality of LTF subsequences is based on a High Efficiency (HE) LTF (HE-LTF) sequence for a subchannel having an 80 MHz channel bandwidth.

Aspect 18: The method of any one of aspects 16 or 17, wherein a symbol duration of each symbol of the LTF is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences.

Aspect 19: The method of any one of aspects 16, 17, or 18, wherein the symbol duration of each symbol of the LTF sequence is 3.2 µs plus a guard interval and the symbol duration of each symbol of the data field is 12.8 µs plus the guard interval.

Aspect 20: The method of any one of aspects 18 or 19, wherein the selectively phase-rotated one or more of the plurality of LTF subsequences are based on a set of phase rotation values s=[s1 s2 s3 s4 s5 s6 s7 s8], and each of the LTF subsequences is based on a first LTF base sequence LTF-A and a second LTF base sequence LTF-B.

Aspect 21: The method of any one of aspects 18, 19, or 20, wherein the first LTF subsequence={s1*LTF-A, 0, s2*LTF-B}; the second LTF subsequence={s3*LTF-A, 0, s4*LTF-B}; the third LTF subsequence={s5*LTF-A, 0, s6*LTF-B}; and the fourth LTF subsequence={s7*LTF-A, 0, s8*LTF-B}.

Aspect 22: The method of any one of aspects 20 or 21, wherein the set of phase rotation values s=[s1 s2 s3 s4 s5 s6 s7 s8]=[1 1 1 1 −1 −1 −1 −1].

Aspect 23: The method of any one of aspects 16, 17, 18, 19, 20, 21, or 22, wherein the first LTF base sequence LTF-A is: {−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, 0}; and the second LTF base sequence LTF-B is: {0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1}.

Aspect 24: The method of aspect 16, wherein a symbol duration of each symbol of the LTF sequence is the same as a symbol duration of each symbol of the data field, and the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LFT subsequences.

Aspect 25: The method of any one of aspects 16 or 24, wherein the selectively phase-rotated one or more of the plurality of LTF subsequences are based on a set of phase rotation values n=[n1 n2 n3 n4 n5 n6 n7 n8] to the plurality of LTF subsequences, and each of the LTF subsequences being based on a first LTF base sequence LTF-A and a second LTF base sequence LTF-B, and the first LTF subsequence={n1*LTF-A, 0, n2*LTF-B}; the second LTF subsequence={n3*LTF-A, 0, n4*LTF-B}; the third LTF subsequence={n5*LTF-A, 0, n6*LTF-B}; and the fourth LTF subsequence={n7*LTF-A, 0, n8*LTF-B}.

Aspect 26: A wireless communication device, comprising: at least one processor; and at least one memory communicatively coupled with the at least one processor and storing processor-readable code that, when executed by the at least one processor, is configured to: receive a wireless packet that includes a long training field (LTF) sequence and a data field via a first channel having a 320 MHz total channel bandwidth a 240 MHz total channel bandwidth; detect the LTF within the packet, the LTF sequence being based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio; and receive the data field based on the detected LTF.

Aspect 27: The method of aspect 26, wherein a symbol duration of each symbol of the LTF is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences.

Aspect 28: The method of any one of aspects 26 or 27, wherein the selectively phase-rotated one or more of the plurality of LTF subsequences are based on a set of phase rotation values s=[s1 s2 s3 s4 s5 s6 s7 s8], and each of the LTF subsequences is based on a first LTF base sequence LTF-A and a second LTF base sequence LTF-B, and the first LTF subsequence={s1*LTF-A, 0, s2*LTF-B}; the second LTF subsequence={s3*LTF-A, 0, s4*LTF-B}; the third LTF subsequence={s5*LTF-A, 0, s6*LTF-B}; and the fourth LTF subsequence={s7*LTF-A, 0, s8*LTF-B}.

Aspect 29: The method of any one of aspects 27 or 28, wherein the set of phase rotation values s=[s1 s2 s3 s4 s5 s6 s7 s8]=[1 1 1 1 −1 −1 −1 −1].

Aspect 30: The method of any one of aspects 27, 29, or 29, wherein: the first LTF base sequence LTF-A is: {−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, 0, 0, −1, 0, 0, 0, +1, 0, 0, 0, −1, 0, 0, 0, −1, 0, 0, 0}; and the second LTF base sequence LTF-B is: {0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, +1}.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
   generating a data field for transmission using a first channel having a 320 MHz total channel bandwidth or a 240 MHz total channel bandwidth;

obtaining a long training field (LTF) sequence based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio, wherein a symbol duration of each symbol of the LTF sequence is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences; and transmitting a wireless packet that includes the LTF sequence and the data field to at least one second wireless communication device via the first channel.

2. The method of claim 1, wherein each of the plurality of LTF subsequences is based on a High Efficiency (HE) LTF (HE-LTF) sequence for a subchannel having an 80 MHz channel bandwidth.

3. The method of claim 1, wherein the symbol duration of each symbol of the LTF sequence is 3.2 μs plus a guard interval and the symbol duration of each symbol of the data field is 12.8 μs plus the guard interval.

4. The method of claim 1, wherein the selectively phase-rotated one or more of the plurality of LTF subsequences are based on a set of phase rotation values s=[s1 s2 s3 s4 s5 s6 s7 s8] to the plurality of LTF subsequences, where each rotation value s1, s2, s3, s4, s5, s6, s7, s8 is either +1, 0, or −1, each of the LTF subsequences being based on a first LTF base sequence LTF-A and a second LTF base sequence LTF-B, the first and second LTF base sequences LTF-A and LTF-B including a plurality of +1, 0, and/or −1 values.

5. The method of claim 4, wherein:
the first LTF subsequence={s1*LTF-A, 0, s2*LTF-B};
the second LTF subsequence={s3*LTF-A, 0, s4*LTF-B};
the third LTF subsequence={s5*LTF-A, 0, s6*LTF-B}; and
the fourth LTF subsequence={s7*LTF-A, 0, s8*LTF-B}.

6. The method of claim 5, wherein the set of phase rotation values s=[s1 s2 s3 s4 s5 s6 s7 s8]=[1 1 1 1 −1 −1 −1 −1].

7. The method of claim 6, wherein:
the first LTF base sequence LTF-A is:
{−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, 0, 0, −1, 0, 0, 0}; and the second LTF base sequence LTF-B is:
{0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, 0, +1, 0, 0, 0, −1, 0, 0, 0, +1, 0, 0, 0, +1, 0, 0, 0, −1, 0, 0, 0, 0, 0, −1, 0, 0, 0, +1, 0, 0, 0, −1, 0, 0, 0, +1, 0, 0, 0, −1, 0, 0, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, 0, +1}.

8. The method of claim 1, wherein a symbol duration of each symbol of the LTF sequence is the same as a symbol duration of each symbol of the data field, and the concatenation is a sequence formed by concatenating, in any order, the first LTF subsequence of the plurality of LTF subsequences, the second LTF subsequence of the plurality of LTF subsequences, the third LTF subsequence of the plurality of LTF subsequences, and the fourth LTF subsequence of the plurality of LTF subsequences, with k filler zeros between adjacent ones of the plurality of LFT subsequences.

9. The method of claim 8, wherein the selectively phase-rotated one or more of the plurality of LTF subsequences are based on a set of phase rotation values n=[n1 n2 n3 n4 n5 n6 n7 n8] to the plurality of LTF subsequences, where each rotation value n1, n2, n3, n4, n5, n6, n7, n8 is either +1, 0, or −1, each of the LTF subsequences being based on a first LTF base sequence LTF-A and a second LTF base sequence LTF-B, the first and second LTF base sequences LTF-A and LTF-B including a plurality of +1, 0, and/or −1 values, and
the first LTF subsequence={n1*LTF-A, 0, n2*LTF-B};
the second LTF subsequence={n3*LTF-A, 0, n4*LTF-B};
the third LTF subsequence={n5*LTF-A, 0, n6*LTF-B}; and
the fourth LTF subsequence={n7*LTF-A, 0, n8*LTF-B}.

10. A wireless communication device, comprising:
at least one processor; and
at least one memory communicatively coupled with the at least one processor and storing processor-readable code that, when executed by the at least one processor, is configured to:

generate a data field for transmission using a first channel having a 320 MHz total channel bandwidth or a 240 MHz total channel bandwidth;

obtaining a long training field (LTF) sequence based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio, wherein a symbol duration of each symbol of the LTF sequence is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences; and transmit a wireless packet that includes the LTF sequence and the data field to at least one second wireless communication device via the first channel.

11. The wireless communication device of claim 10, wherein the selectively phase-rotated one or more of the plurality of LTF subsequences are based on a set of phase rotation values s=[s1 s2 s3 s4 s5 s6 s7 s8] to the plurality of LTF subsequences, where each rotation value s1, s2, s3, s4, s5, s6, s7, s8 is either +1, 0, or −1, each of the LTF subsequences being based on a first LTF base sequence LTF-A and a second LTF base sequence LTF-B, the first and second LTF base sequences LTF-A and LTF-B including a plurality of +1, 0, and/or −1 values, and the first LTF subsequence={s1*LTF-A, 0, s2*LTF-B};
the second LTF subsequence={s3*LTF-A, 0, s4*LTF-B};
the third LTF subsequence={s5*LTF-A, 0, s6*LTF-B}; and
the fourth LTF subsequence={s7*LTF-A, 0, s8*LTF-B}.

12. The wireless communication device of claim 11, wherein the set of phase rotation values s=[s1 s2 s3 s4 s5 s6 s7 s8]=[1 1 1 1 −1 −1 −1 −1].

13. The wireless communication device of claim 12, wherein:

the first LTF base sequence LTF-A is:
{−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, −1, 0, 0, 0, −1, 0, 0, 0, −1, 0, 0, 0, −1, 0, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, 0, −1, 0, 0, 0, +1, 0, 0, 0, −1, 0, 0, 0, −1, 0, 0, 0, +1, 0, 0, 0, 0, 0, −1, 0, 0, 0}; and the second LTF base sequence LTF-B is:
{0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, 0, −1, 0, 0, 0, +1, 0, 0, 0, +1, 0, 0, 0, −1, 0, 0, 0, +1, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, 0, 0, +1}.

14. A method for wireless communications by a wireless communication device, comprising:

receiving a wireless packet that includes a long training field (LTF) sequence and a data field via a first channel having a 320 MHz total channel bandwidth or a 240 MHz total channel bandwidth;

detecting the LTF sequence within the packet, the LTF sequence being based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio, wherein a symbol duration of each symbol of the LTF is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences; and receiving the data field based on the detected LTF sequence.

15. The method of claim 14, wherein each of the plurality of LTF subsequences is based on a High Efficiency (HE) LTF (HE-LTF) sequence for a subchannel having an 80 MHz channel bandwidth.

16. The method of claim 14, wherein the symbol duration of each symbol of the LTF sequence is 3.2 μs plus a guard interval and the symbol duration of each symbol of the data field is 12.8 μs plus the guard interval.

17. The method of claim 16, wherein the selectively phase-rotated one or more of the plurality of LTF subsequences are based on a set of phase rotation values s=[s1 s2 s3 s4 s5 s6 s7 s8], where each rotation value s1, s2, s3, s4, s5, s6, s7, s8 is either +1, 0, or −1, and each of the LTF subsequences is based on a first LTF base sequence LTF-A and a second LTF base sequence LTF-B, the first and second LTF base sequences LTF-A and LTF-B including a plurality of +1, 0, and/or −1 values.

18. The method of claim 17, wherein:
the first LTF subsequence={s1*LTF-A, 0, s2*LTF-B};
the second LTF subsequence={s3*LTF-A, 0, s4*LTF-B};
the third LTF subsequence={s5*LTF-A, 0, s6*LTF-B}; and
the fourth LTF subsequence={s7*LTF-A, 0, s8*LTF-B}.

19. The method of claim 18, wherein the set of phase rotation values s=[s1 s2 s3 s4 s5 s6 s7 s8]=[1 1 1 1 −1 −1 −1 −1].

20. The method of claim 19, wherein:
the first LTF base sequence LTF-A is:
{−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, 0, −1, 0, 0, 0, +1, 0, 0, 0, −1, 0, 0, 0, +1, 0, 0, 0, +1, 0, 0, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, −1, 0, 0, 0, +1, 0, 0, 0, −1, 0, 0, 0, −1, 0, 0, 0, −1, 0, 0, 0, −1, 0, 0, 0, 0, −1, 0, 0, 0, +1, 0, 0, 0, −1, 0, 0, 0, +1, 0, 0, 0, −1, 0, 0, 0, 0, 0, −1, 0, 0, 0}; and
the second LTF base sequence LTF-B is:
{0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, 0, +1, 0, 0, 0, −1, 0, 0, 0, +1, 0, 0, 0, +1, 0, 0, 0, +1, 0, 0, 0, −1, 0, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, 0, −1, 0, 0, 0, −1, 0, 0, 0, −1, 0, 0, 0, +1, 0, 0, 0, +1, 0, 0, 0, −1, 0, 0, 0, 0, −1, 0, 0, 0, −1, 0, 0, 0, −1, 0, 0, 0, +1, 0, 0, 0, −1, 0, 0, 0, 0, 0, +1, 0, 0, 0, −1, 0, 0, 0, −1, 0, 0, 0, −1, 0, 0, 0, +1, 0, 0, 0, +1}.

21. The method of claim 14, wherein a symbol duration of each symbol of the LTF sequence is the same as a symbol duration of each symbol of the data field, and the concatenation is a sequence formed by concatenating, in any order, the first LTF subsequence of the plurality of LTF subsequences, the second LTF subsequence of the plurality of LTF subsequences, the third LTF subsequence of the plurality of LTF subsequences, and the fourth LTF subsequence of the plurality of LTF subsequences, with k filler zeros between adjacent ones of the plurality of LFT subsequences.

22. The method of claim 21, wherein the selectively phase-rotated one or more of the plurality of LTF subsequences are based on a set of phase rotation values n=[n1 n2 n3 n4 n5 n6 n7 n8] to the plurality of LTF subsequences, where each rotation value n1, n2, n3, n4, n5, n6, n7, n8 is either +1, 0, or −1, and each of the LTF subsequences being based on a first LTF base sequence LTF-A and a second LTF base sequence LTF-B, the first and second LTF base sequences LTF-A and LTF-B including a plurality of +1, 0, and/or −1 values, and
the first LTF subsequence={n1*LTF-A, 0, n2*LTF-B};
the second LTF subsequence={n3*LTF-A, 0, n4*LTF-B};
the third LTF subsequence={n5*LTF-A, 0, n6*LTF-B}; and
the fourth LTF subsequence={n7*LTF-A, 0, n8*LTF-B}.

23. A wireless communication device, comprising:
at least one processor; and
at least one memory communicatively coupled with the at least one processor and storing processor-readable code that, when executed by the at least one processor, is configured to:
receive a wireless packet that includes a long training field (LTF) sequence and a data field via a first channel having a 320 MHz total channel bandwidth a 240 MHz total channel bandwidth;
detect the LTF within the packet, the LTF sequence being based on a concatenation of a plurality of LTF subsequences, each LTF subsequence being associated with a channel bandwidth less than the total channel bandwidth of the first channel, one or more of the plurality of LTF subsequences being selectively phase-rotated to reduce a peak-to-average power ratio, wherein a symbol duration of each symbol of the LTF is one-fourth as long as a symbol duration of each symbol of the data field, and wherein the concatenation is a sequence formed by concatenating, in any order, a first LTF subsequence of the plurality of LTF subsequences, a second LTF subsequence of the plurality of LTF subsequences, a third LTF subsequence of the plurality of LTF subsequences, and a fourth LTF subsequence of the plurality of LTF subsequences, with k filler zeros between adjacent ones of the plurality of LTF subsequences; and
receive the data field based on the detected LTF.

24. The wireless communication device of claim 23, wherein the selectively phase-rotated one or more of the plurality of LTF subsequences are based on a set of phase rotation values s=[s1 s2 s3 s4 s5 s6 s7 s8], where each rotation value s1, s2, s3, s4, s5, s6, s7, s8 is either +1, 0, or −1, and each of the LTF subsequences is based on a first LTF base sequence LTF-A and a second LTF base sequence LTF-B, the first and second LTF base sequences LTF-A and LTF-B including a plurality of +1, 0, and/or −1 values, and the first LTF subsequence={s1*LTF-A, 0, s2*LTF-B};
the second LTF subsequence={s3*LTF-A, 0, s4*LTF-B};
the third LTF subsequence={s5*LTF-A, 0, s6*LTF-B}; and
the fourth LTF subsequence={s7*LTF-A, 0, s8*LTF-B}.

25. The wireless communication device of claim 24, wherein the set of phase rotation values s=[s1 s2 s3 s4 s5 s6 s7 s8]=[1 1 1 1 −1 −1 −1 −1].

26. The wireless communication device of claim 25, wherein:

the first LTF base sequence LTF-A is:

{−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, 0}; and the second LTF base sequence LTF-B is:

{0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1}.

* * * * *